US009918248B2

(12) United States Patent
Liu et al.

(10) Patent No.: US 9,918,248 B2
(45) Date of Patent: *Mar. 13, 2018

(54) SERVICE CONTINUITY DURING LOCAL BREAKOUT IN A FEMTOCELL

(71) Applicants: AT&T Intellectual Property I, L.P., Atlanta, GA (US); AT&T Mobility II LLC, Atlanta, GA (US)

(72) Inventors: Cheng P. Liu, Duluth, GA (US); Kurt Huber, Kennesaw, GA (US); Alireza Faryar, Fair Haven, NJ (US); Sangar Dowlatkhah, Alpharetta, GA (US)

(73) Assignees: AT&T INTELLECTUAL PROPERTY I, L.P., Atlanta, GA (US); AT&T MOBILITY II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/804,304

(22) Filed: Jul. 20, 2015

(65) Prior Publication Data
US 2015/0327194 A1 Nov. 12, 2015

Related U.S. Application Data

(63) Continuation of application No. 14/332,131, filed on Jul. 15, 2014, now Pat. No. 9,119,060, which is a (Continued)

(51) Int. Cl.
H04W 88/08 (2009.01)
H04W 28/02 (2009.01)
(Continued)

(52) U.S. Cl.
CPC ......... *H04W 28/0231* (2013.01); *H04L 47/10* (2013.01); *H04L 69/03* (2013.01);
(Continued)

(58) Field of Classification Search
None
See application file for complete search history.

(56) References Cited

U.S. PATENT DOCUMENTS 6,628,610 B1 9/2003 Waclawsky et al.
6,826,150 B1 11/2004 Bhattacharya et al.
(Continued)

OTHER PUBLICATIONS

Office Action dated Feb. 1, 2012 for U.S. Appl. No. 12/623,176, 22 pages.
(Continued)

Primary Examiner — Christopher Crutchfield
Assistant Examiner — Alan Lindenbaum
(74) Attorney, Agent, or Firm — Amin, Turocy & Watson, LLP

(57) ABSTRACT

Service continuity when a user equipment (UE) employing local breakout mechanisms at a femto access point (FAP) for a communication session and moves out of the femto coverage area is disclosed. In particular, a network change detection component can be employed to detect when the UE, attached to the FAP, changes its connection from the femto network to the macro network. Further, an active communication session can exist between the UE and a device/service/application on a local Area network (LAN) connected to a FAP, and/or the Internet, which utilizes local breakout at the FAP. When the UE moves out of the femto network, a context management component can be employed to seamlessly resume the communication session, via the macro network.

20 Claims, 16 Drawing Sheets

Related U.S. Application Data continuation of application No. 12/623,223, filed on Nov. 20, 2009, now Pat. No. 8,817,699.

(60) Provisional application No. 61/117,005, filed on Nov. 21, 2008.

(51) Int. Cl.

| | | |
|---|---|---|
| *H04L 12/801* | (2013.01) | |
| *H04W 28/08* | (2009.01) | |
| *H04W 64/00* | (2009.01) | |
| *H04W 56/00* | (2009.01) | |
| *H04W 36/00* | (2009.01) | |
| *H04W 40/02* | (2009.01) | |
| *H04W 88/12* | (2009.01) | |
| *H04W 4/26* | (2009.01) | |
| *H04W 24/02* | (2009.01) | |
| *H04W 40/24* | (2009.01) | |
| *H04L 29/06* | (2006.01) | |
| *H04W 24/08* | (2009.01) | |
| *H04W 80/04* | (2009.01) | |
| *H04W 84/04* | (2009.01) | |

(52) U.S. Cl.
CPC ............ *H04W 4/26* (2013.01); *H04W 24/02* (2013.01); *H04W 24/08* (2013.01); *H04W 28/0226* (2013.01); *H04W 28/0268* (2013.01); *H04W 28/0289* (2013.01); *H04W 28/08* (2013.01); *H04W 36/0022* (2013.01); *H04W 40/02* (2013.01); *H04W 40/248* (2013.01); *H04W 56/00* (2013.01); *H04W 56/001* (2013.01); *H04W 64/00* (2013.01); *H04W 88/12* (2013.01); *H04W 80/04* (2013.01); *H04W 84/045* (2013.01)

(56) References Cited

U.S. PATENT DOCUMENTS

| | | | |
|---|---|---|---|
| 6,847,610 B1 | 1/2005 | Suumaki et al. | |
| 7,369,489 B1 | 5/2008 | Bhattacharya et al. | |
| 7,843,843 B1 | 11/2010 | Papp, III et al. | |
| 7,953,002 B2 | 5/2011 | Opsasnick | |
| 8,811,338 B2 | 8/2014 | Jin et al. | |
| 8,831,566 B2 | 9/2014 | Liu et al. | |
| 2002/0181395 A1 | 12/2002 | Foster et al. | |
| 2002/0191595 A1 | 12/2002 | Mar et al. | |
| 2003/0054795 A1* | 3/2003 | Tamaki | H04L 12/14 455/406 |
| 2003/0169771 A1 | 9/2003 | Ahn et al. | |
| 2004/0051664 A1 | 3/2004 | Frank | |
| 2004/0125937 A1 | 7/2004 | Turcan et al. | |
| 2004/0243715 A1* | 12/2004 | Yokoyama | H04L 29/06 709/231 |
| 2005/0089042 A1 | 4/2005 | Ruutu et al. | |
| 2005/0152401 A1 | 7/2005 | Wilijakka et al. | |
| 2005/0235348 A1 | 10/2005 | Coley et al. | |
| 2005/0265363 A1 | 12/2005 | Chen | |
| 2006/0025154 A1 | 2/2006 | Alapuranen et al. | |
| 2006/0221819 A1 | 10/2006 | Padwekar | |
| 2006/0250578 A1 | 11/2006 | Pohl et al. | |
| 2006/0262732 A1 | 11/2006 | Joutsenvirta et al. | |
| 2007/0005808 A1 | 1/2007 | Day | |
| 2007/0253359 A1 | 11/2007 | Hall | |
| 2007/0258427 A1 | 11/2007 | Shaheen et al. | |
| 2008/0013477 A1 | 1/2008 | Claussen et al. | |
| 2008/0020775 A1 | 1/2008 | Willars | |
| 2008/0037552 A1 | 2/2008 | Dos Remedios et al. | |
| 2008/0207170 A1 | 8/2008 | Khetawat et al. | |
| 2009/0046074 A1 | 2/2009 | Shneidman et al. | |
| 2009/0061821 A1 | 3/2009 | Chen et al. | |
| 2009/0098890 A1 | 4/2009 | Vasudevan et al. | |
| 2009/0100492 A1 | 4/2009 | Hicks et al. | |
| 2009/0129263 A1 | 5/2009 | Osborn | |
| 2009/0168766 A1 | 7/2009 | Eyuboglu et al. | |
| 2009/0207843 A1 | 8/2009 | Andreasen | |
| 2009/0268668 A1 | 10/2009 | Tinnakornsrisuphap et al. | |
| 2009/0279543 A1 | 11/2009 | Strom et al. | |
| 2009/0285176 A1 | 11/2009 | Zheng et al. | |
| 2009/0311987 A1 | 12/2009 | Edge et al. | |
| 2010/0054129 A1 | 3/2010 | Kuik et al. | |
| 2010/0056144 A1 | 3/2010 | Gallagher et al. | |
| 2010/0088425 A1 | 4/2010 | Hooda et al. | |
| 2010/0103924 A1 | 4/2010 | Rao et al. | |
| 2010/0159895 A1 | 6/2010 | Wallis et al. | |
| 2011/0038318 A1* | 2/2011 | Parsons | H04W 80/04 370/328 |
| 2012/0289246 A1 | 11/2012 | Huber et al. | |

OTHER PUBLICATIONS

Office Action dated Mar. 1, 2012 for U.S. Appl. No. 12/623,210, 19 pages.
Office Action dated Mar. 1, 2012 for U.S. Appl. No. 12/623,223, 15 pages.
Office Action dated May 31, 2012 for U.S. Appl. No. 12/623,176, 20 pages.
Office Action dated Jul. 31, 2012 for U.S. Appl. No. 12/623,210, 25 pages.
Office Action dated Jul. 9, 2012 for U.S. Appl. No. 12/623,223, 29 pages.
Office Action dated Jun. 26, 2012 for U.S. Appl. No. 12/623,237, 29 pages.
Office Action dated Mar. 19, 2013 for U.S. Appl. No. 12/623,210, 28 pages.
Office Action dated Feb. 1, 2013 for U.S. Appl. No. 12/623,237, 29 pages.
Office Action dated Oct. 1, 2013 for U.S. Appl. No. 12/623,176, 28 pages.
Office Action dated Oct. 30, 2013 for U.S. Appl. No. 12/623,210, 27 pages.
Office Action dated Dec. 30, 2013 for U.S. Appl. No. 12/623,237, 28 pages.
Office Action dated Oct. 31, 2014 for U.S. Appl. No. 14/304,297, 21 pages.
Office Action dated Dec. 3, 2014 for U.S. Appl. No. 14/332,131, 23 pages.
Office Action dated Feb. 25, 2015 for U.S. Appl. No. 14/449,890, 26 pages.
Office Action dated Sep. 4, 2015 for U.S. Appl. No. 14/735,914, 27 pages.
Office Action dated Feb. 3, 2016 for U.S. Appl. No. 14/735,914, 40 pages.
Office Action dated Aug. 5, 2016 for U.S. Appl. No. 14/735,914, 28 pages.
Office Action dated Apr. 5, 2017 for U.S. Appl. No. 14/857,782, 56 pages.
Office Action dated Oct. 17, 2017 for U.S. Appl. No. 14/857,782, 53 pages.

* cited by examiner

SERVICE CONTINUITY DURING LOCAL BREAKOUT IN A FEMTOCELL

CROSS-REFERENCE TO RELATED APPLICATIONS

This application is a continuation of, and claims priority to each of, U.S. patent application Ser. No. 14/332,131, filed on Jul. 15, 2014, entitled "SERVICE CONTINUITY DURING LOCAL BREAKOUT IN A FEMTOCELL," which is a continuation of U.S. patent application Ser. No. 12/623,223, filed on Nov. 20, 2009, entitled "SERVICE CONTINUITY DURING LOCAL BREAKOUT IN A FEMTOCELL," now issued as U.S. Pat. No. 8,817,699, which claims priority to U.S. Provisional Patent App. No. 61/117,005, filed on Nov. 21, 2008, and entitled "FEMTO CELL LOCAL BREAKOUT MECHANISMS". The entireties of each of the foregoing applications are incorporated herein by reference.

TECHNICAL FIELD

The subject disclosure relates to wireless communications and, more particularly, to providing service continuity during local breakout at a femto access point when a user equipment (UE) moves between the femtocell and macro cell.

BACKGROUND

Femtocells—building-based wireless access points interfaced with a wired broadband network—are traditionally deployed to improve indoor wireless coverage, and to offload a mobility radio access network (RAN) operated by a wireless service provider. Improved indoor coverage includes stronger signal and improved reception (e.g., video, sound, or data), ease of session or call initiation, and session or call retention, as well. Offloading a RAN reduces operational and transport costs for the service provider since a lesser number of end users utilizes over-the-air radio resources (e.g., radio frequency channels), which are typically limited. With the rapid increase in utilization of communications networks and/or devices, mobile data communications have been continually evolving due to increasing requirements of workforce mobility, and, services provided by femtocells can be extended beyond indoor coverage enhancement.

Conventional systems that employ femtocells, transport information (e.g., data and/or voice) from a user equipment (UE) including Internet bound traffic and home network bound traffic, through a landline network to a macro radio access network (RAN). The information is received at the macro RAN and the Internet bound data can be identified and routed to the Internet from the core network, while the home network bound data is directed back to the home network from the core network. This can lead to significant network congestion in the landline network and/or macro RAN. Further, since data sent by the UE is routed to the home network from the wireless core network only after traversing through the landline network, the response time is substantially high. Accordingly, bandwidth utilization in the traditional approach is inefficient and can negatively impact performance and customer satisfaction.

DETAILED DESCRIPTION

Figure 1:
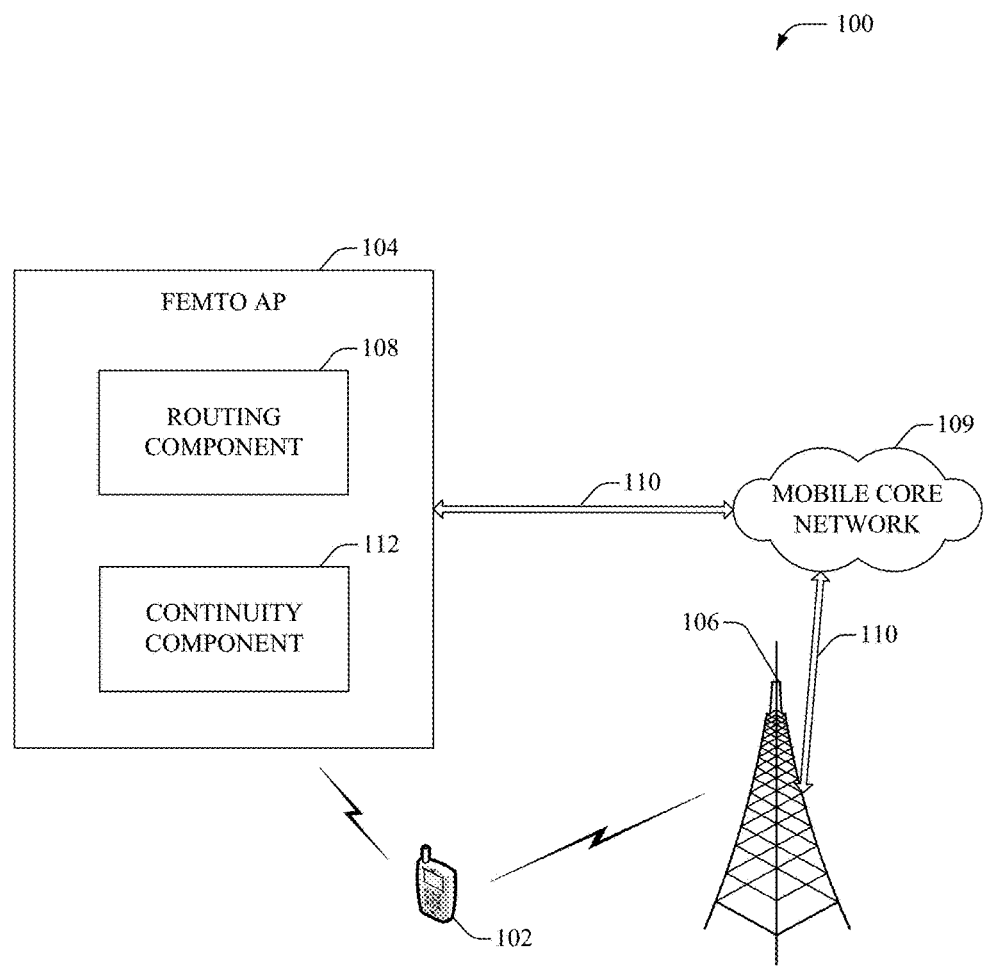
FIG. 1 illustrates an example system that facilitates seamless communication with a user equipment (UE), when switching between a femtocell and macro cell, during local breakout at the femto access point (AP).

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service," "framework," "connector," "agent," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the various embodiments.

In addition, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. Additionally, the terms "femtocell network", and "femto network" are utilized interchangeably, while "macro cell network" and "macro network" are utilized interchangeably herein. Further, the terms "core network", "mobility core network", "mobile core network", "core mobility network", "core mobile network" and "mobility network" are utilized interchangeably herein.

Furthermore, the terms "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, the terms "femtocell access point", "femtocell", "femto access point," "home base station," "home eNode B(HeNB)," "home Node B (HNB)," and the like, are also utilized interchangeably.

Systems and methods disclosed herein employ local breakout mechanisms at a femto access point (FAP) that can reduce network congestion in a macro RAN and/or a backhaul network connected to the femto AP. In one aspect, a user equipment (UE) attached to the femto AP can communicate directly with a home/enterprise LAN (e.g., connected to the femto AP) and/or the Internet, without utilizing core network resources. In addition, service continuity can be maintained when the UE, communicating directly via the femto AP, moves between the femtocell and the macro cell.

Aspects, features, or advantages of the subject innovation can be exploited in substantially any wireless communication technology; e.g., Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

The systems and methods disclosed herein, in one aspect thereof, can facilitate local breakout mechanisms at a femto access point (FAP) to reduce backhaul and/or macro network congestion. Moreover, a slave Gateway GPRS Support Node (GGSN) can be integrated within the FAP to breakout a packet data protocol (PDP) context connection and directly route the traffic between a user equipment (UE) at the FAP and a local network or Internet. In one example, Local Area Network (LAN) bound traffic can be identified and directly routed to a device and/or application on a LAN connected to the femto AP, for example, a Digital home (DH) LAN. In an aspect a UE DH agent can be employed that performs mapping to provide DH functions to the UE attached to the femto AP. Specifically, the UE DH agent can enable the UE to behave as a DH compliant device in the DH LAN. In addition, Internet bound traffic from the UE can be directly routed to the Internet via the DH LAN.

In accordance with another aspect of the system, a continuity component can be employed to maintain continuity of a communication session between the UE and the Internet, or a device, service and/or application of the DH LAN, when the UE detaches from the FAP. In particular, a network change detection component can be utilized to determine when the UE changes its connection from one network to another, for example, femto network to macro network or vice versa. Further, a context management component can be employed to seamlessly resume communication session on the newly connected network. Specifically, the slave GGSN in the FAP can seamlessly resume a PDP context communication session between the FAP and the core GGSN from a local breakout session, such that a UE can handover to the newly connected network (e.g., macro wireless network). In addition, the network change detection component can also detect when the communication session can be transferred from one UE to another. Moreover, the context management component can seamlessly resume the communication session on the new device by employing a halted session transfer mechanism.

Yet another aspect of the disclosed subject matter relates to a method that can be employed restore a communication session when a UE switches between a macro network and a femto network. Typically, a switch in the UE's network can be determined and accordingly, status information associated with one or more active communication sessions can be stored in a database. As an example, the status information can include a point up to which the communication session has been completed. Further, when the UE switches to the new network, the status information can be utilized to resume the communication sessions over the new network, from a point where they had previously switched.

Referring initially to FIG. 1, there illustrated is an example system 100 that facilitates seamless communication with a user equipment (UE) 102 when switching between a femtocell and macro cell, during local breakout at the femto access point (FAP) 104, according to an aspect of the subject disclosure. In one embodiment, the UE 102, can be located within a coverage area of the FAP 104 and can attach to the FAP 104 by employing most any attachment procedure. Typically, the UE 102 as disclosed herein can include most any communication device employed by a subscriber, such as, but not limited to, a cellular phone, a personal digital assistant (PDA), a laptop, a personal computer, a media player, a gaming console, and the like. Moreover, the UE 102 can access a mobile core network 109 through the femto network via FAP 104 and/or a macro network via base station 106. It can be appreciated that the macro network can include most any radio environment, such as, but not limited to, Universal Mobile Telecommunications System (UMTS), Global System for Mobile communications (GSM), LTE, CDMA, etc. The signaling and bearer technologies, for example circuit switched (CS), and/or packet switched (PS), in a femtocell and macro cell can be the same or different, depending on the radio technologies involved.

Typically, traffic flows between the FAP 104 and mobile core network 109 and between the base station 106 and mobile core network 109 through a broadband backhaul 110 (e.g., optical fiber based technologies (e.g., Ethernet, DS3, etc.), twisted-pair line based technologies (e.g., DSL, T1/E1 phone line, etc.), or coaxial cable based technologies (e.g., DOCSIS, etc.)). The FAP 104 generally can rely on the broadband backhaul 110 for signaling, routing and paging, and for packet communication. According to an embodiment, the FAP 104 can include a routing component 108 that can be utilized to facilitate efficient routing of traffic to via the FAP 104.

In one example, the routing component 108 can include a slave Gateway GPRS Support Node (GGSN). Typically, the slave GGSN can implement functionality substantially similar to the functionality implemented by a GGSN in the mobile core network 109. For example, slave the GGSN can be employed to break the PDP context between a UE and core GGSN and a routing functionality can be implemented by the slave GGSN to perform local breakout at the FAP 104. In addition, the slave GGSN can enable anchoring of a communication session at the routing component 108 rather than the core network GGSN. In the local breakout status, the slave GGSN can set up a (0,0) PDP context, e.g., a (zero uplink data bandwidth, zero downlink data bandwidth) connection between slave GGSN and core GGSN while route (x,y), e.g., (x uplink data bandwidth, y downlink data bandwidth) with a local network or Internet. The (0,0) PDP context link can be utilized to switch local breakout session to core network so UE's handover to new network can accomplished. In one aspect, the routing component 108 can receive traffic (e.g., voice, data, media, etc.) from the UE 102 and/or from the mobile core network 109 (e.g., via the broadband backhaul 110), analyze the received information and determine a route for the received traffic. According to one embodiment, the routing component 108 can selectively route UE traffic away from an Iuh Virtual Private network (VPN) tunnel and send the traffic to a residential/enterprise local IP network destination, for example, via a home/enterprise network, Local Area Network (LAN), and/or a broadband access network (e.g., Internet) (not shown).

For example, the routing component 108 can receive communication packets sent by UE 102 connected to the FAP 104 and can determine information associated with the received packet that can facilitate routing of the packet from the FAP 104 via the slave GGSN. As an example, the routing component 108 can check a header associated with the received packet and determine a destination address. Based in part on the determined destination address, the routing component 108 can compute an optimal route to transfer the received packet, such that, network bandwidth is efficiently utilized. Moreover, the routing component 108 can facilitate route determination based in part on a destination address, source address, type of packet, type of protocol, one or more user and/or service provider defined rules or policies and/or user preferences. Additionally, the routing component 108 can utilize load balancing mechanisms, machine learning techniques, and/or a cost benefit analysis to generate a route for the received packets.

Typically, a femto gateway (not shown) can aggregate regional traffic received from the multiple FAPs and tunnel the traffic to the mobile core network 109. The conventional circuit switched (CS) traffic can be routed to a Mobile Switching Center (MSC) and the packet switched (PS) traffic can be routed to a Serving GPRS Support Node (SGSN) and Gateway GPRS Support Node (GGSN). According to an aspect, the routing component 108 can facilitate communication between UE 102 and a device on a local area network (LAN) (not shown), such as but not limited to, a Digital Home (DH) LAN, by directly routing information between the UE 102 and the LAN (e.g., without routing the traffic through the mobile core network 109). Accordingly, the UE 102 can directly communicate with a device, service and/or application of the LAN, when UE 102 is attached to the FAP 104. Similarly, routing component 108 can route Internet bound traffic, received from the UE 102, directly to the Internet, for example, via the LAN. In one example, the routing component 108 can examine traffic sourced in the UE 102 to separate home/enterprise bound, broadband access network bound and/or Internet bound traffic from the rest.

It can be appreciated that when UE 102 detaches from the FAP 104, the mobile core network 109 can maintain a connection to the UE 102 via the mobility network (e.g., through base station 106). Moreover, the continuity component 112 (e.g., which can be a part of a slave GGSN) can be utilized to facilitate seamless service continuity for the UE 102, when the UE 102 detaches from the femto AP 104. As an example, the continuity component 112 can determine when the UE 102 changes its connection from the femto cell to the macro cell and/or vice versa. In particular, the continuity component 112 can be employed to seamlessly resume communication with the UE 102 on the newly connected network. In one example scenario, when the UE 102 is attached to the femto AP 104, the UE can communicate with a device, service and/or application on the LAN and/or the Internet, by employing local breakout. During communication, the continuity component 112 can determine when the UE 102, is going to move to out of the femtocell, for example, based on user indication, UE location, UE behavior, historical patterns, etc. Accordingly, the continuity component 112 can ensure a seamless handoff to the macro network, such that the communication is performed via the macro network. Similarly, in another example scenario, the UE 102 can be roaming in the macro network (not shown) and can communicate for example, with a device, service and/or application on the LAN and/or the Internet via base station 106. According to an aspect, the continuity component 112, can maintain service continuity when detected that the UE 102 has attached to the femto AP 104. The routing component 108 can then be utilized to facilitate communication of the UE 102 with the device, service and/or application on the LAN and/or the Internet, by employing local breakout at the femto AP 104.

Figure 2:
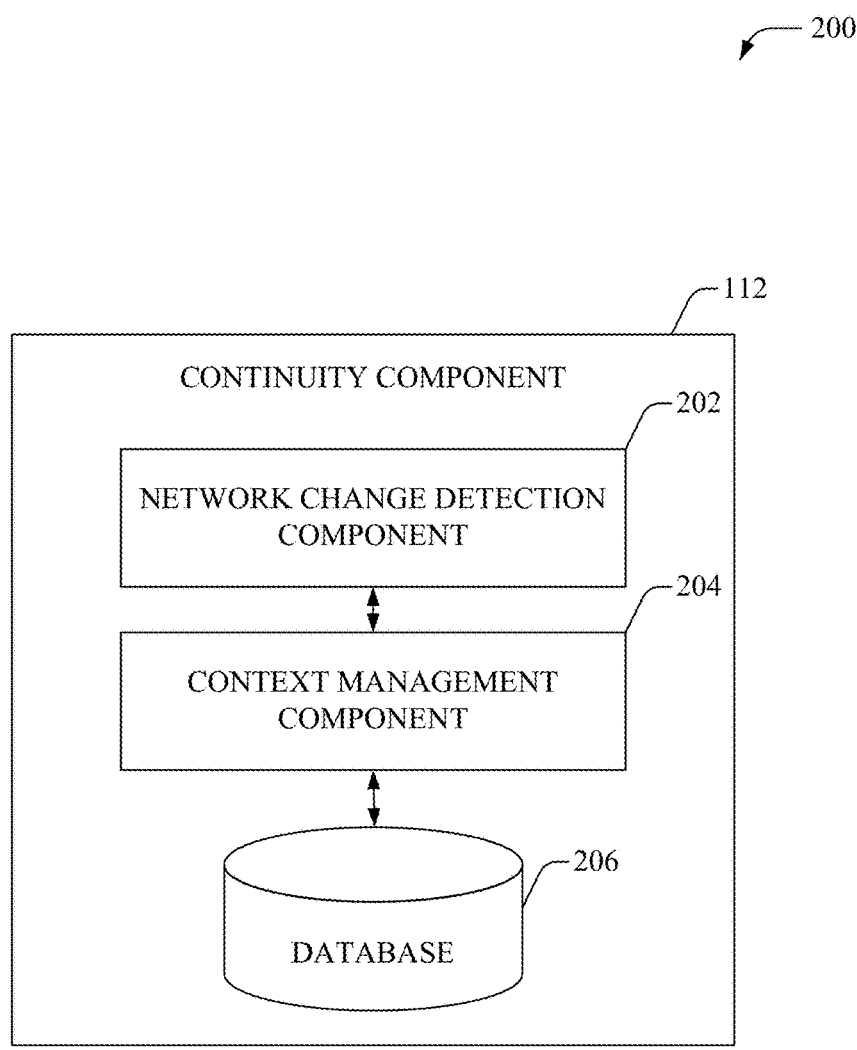
FIG. 2 illustrates an example system that can be employed to facilitate service continuity during local breakout at a femto AP.

FIG. 2 illustrates an example system 200 that can be employed to facilitate service continuity during local breakout mechanisms at a femto access point (AP), in accordance with an aspect of the disclosure. It can be appreciated that the continuity component 112 can include functionality, as more fully described herein, for example, with regard to system 100.

System 200 can include a network change detection component 202 that can determine when the UE changes its connection from one network to another, for example, femto network to macro network or vice versa. In one example, the network change detection component 202 can determine when the UE, attached to the femtocell, leaves the femtocell, based in part on various factors, such as, but not limited to, UE registration data, UE location, UE behavior, historical patterns, user preferences, etc. Further, a context management component 204 can be employed to seamlessly resume content delivery on the newly connected network.

As an example, when the UE connects to a macro network, the UE can indicate a change in connection by updating its registration, which can be detected by the network change detection component 202. According to an aspect, the network change detection component 202 can indicate the change in user network to the context management component 204. The context management component 204 can be employed to determine a context state associated with the communication of the UE, for example, with a device, application, and/or service of the LAN or the Internet. As an example, the context management component 204 can determine a point up to which content has been delivered to the UE, such as, but not limited to, "15 files delivered", "20% of video streamed" etc.

Further, the context management component 204 can store the current context state to a database 206. The database 206 can store the context state, which can include, for example, data associated with the content at a point in time (e.g., video frames up to 30.25 minutes) that has been delivered to the user. It can be appreciated that the context state can include most any data associated with the state of the communication session when the UE moves from one network to another. In one aspect, the context state can be obtained from the device, application and/or service of the LAN and/or the Internet, with which the UE is communicating. Additionally, the database 206 can also store a session-id and/or a user-id associated with the context state that can be employed to facilitate a lookup at a later time. It can be appreciated that although the database 206 is illustrated to reside within the continuity component, for example, in the femto AP, the database 206 can be local or remote to the femto AP, and can also reside within the macro network. According to an aspect, the database 206 can be accessed by and/or the saved context state can be utilized by a component (not shown) in the newly connected network that can be employed to facilitate communication over the new network, such that, the communication session can begin from where it left off. Further, in one aspect, the context management component 204 can also save context state associated with a communication session to the database 206, when determined that the communication session has to be transferred from one device to another.

It can be appreciated that the database 206 described herein can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g. data stores, databases) of the subject systems and methods is intended to comprise, without being limited to, these and any other suitable types of memory.

Figure 3:
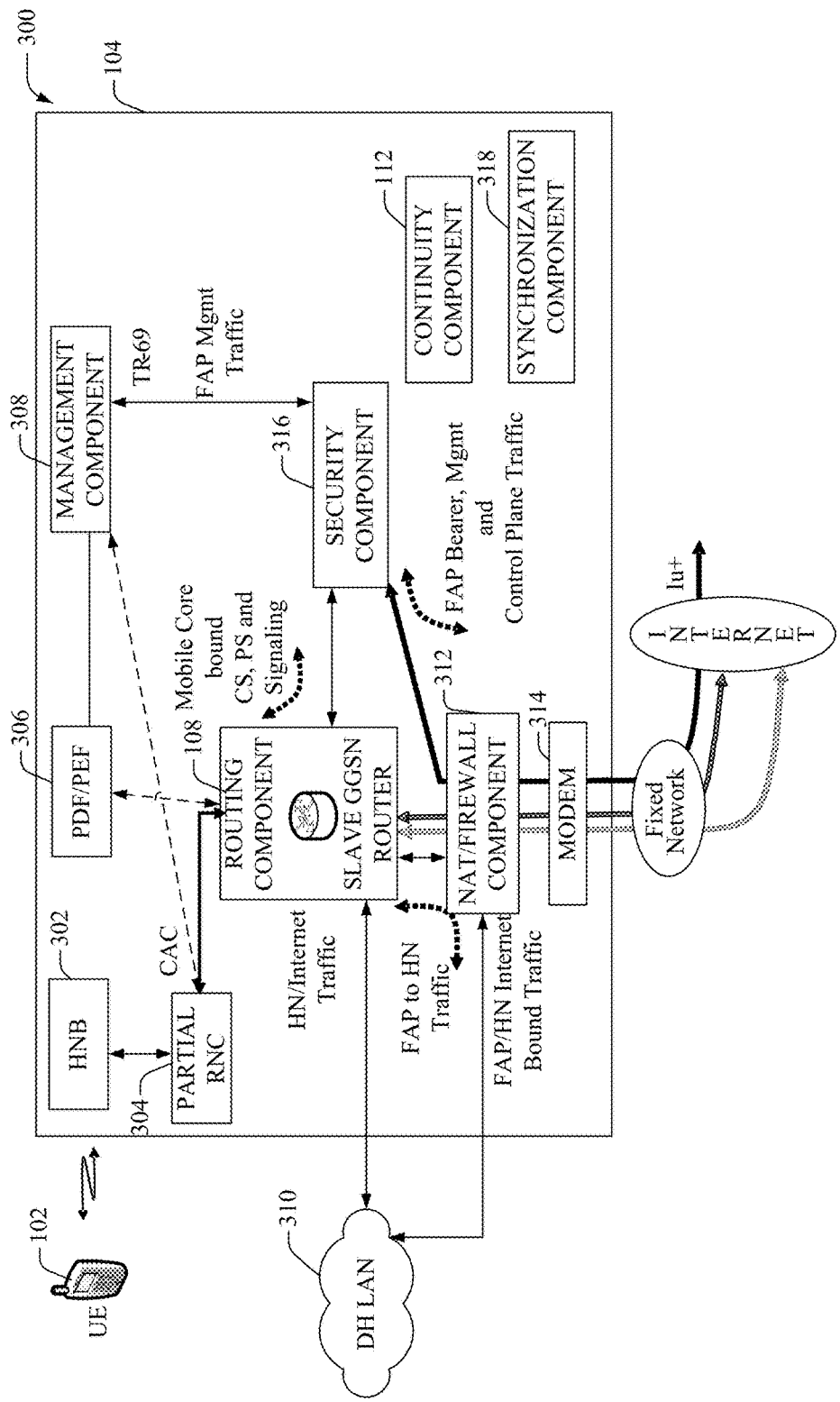
FIG. 3 illustrates an example system that can be employed to facilitate efficient routing of traffic within a femtocell.

Referring now to FIG. 3, there illustrated is an example system 300 that can be employed to facilitate efficient routing of traffic within a femtocell, according to an aspect of the subject disclosure. It can be appreciated that the UE 102, femto AP 104, routing component 108 and continuity component 112 can include respective functionality, as more fully described herein, for example, with regard to systems 100 and 200. Moreover, system 300 includes a femto AP 104 that can be integrated with an integrated residential gateway (RG). Although FIG. 3 illustrates an RG that is integrated within the femto AP 104, it can be appreciated that the RG can be externally connected to the femto AP 104. Further, Femto AP 104 can be connected to a LAN, for example digital home (DH) LAN 310, by a wireless and/or wired connection. It can be appreciated that the DH LAN 310 disclosed herein, can be most any LAN and can be deployed in most any area, such as but not limited to, a house, an office, a building, a warehouse, a store, a restaurant, a hotel, a factory, etc.

Typically, the femto AP 104 can receive communications from a UE 102. The UE 102 can be most any communication device employed by a user, for example, a cellular phone, a gaming module, a laptop, a television, a projector, personal computer, a personal digital assistant (PDA) etc. Moreover, the UE 102 can utilize various technologies for terrestrial wireless communication, for example, an advanced second generation (2.5G) telecommunication technology such as Enhanced Data Rate for Global System for Mobile Communications (GSM) Evolution (EDGE); a third generation technology (3G) like Third Generation Partnership Project (3GPP) Universal Mobile Telecommunication System (UMTS), 3GPP Long Term Evolution (LTE), a 3GPP2 Evolution Data Only (EVDO) system, or Ultra-broadband Mobility (UMB); advanced 3G such as Worldwide Interoperability for Microwave Access (WiMax); or a fourth generation (4G) technology such as for example Long Term Evolution (LTE) Advanced. Additionally, a UE 102 can consume satellite-based traffic such as data originated from GPS, GLONNAS, or Galileo systems, conveyed through a deepspace link (not shown).

In one aspect, the Home Node B (HNB) 302 can receive communication from the UE 102 and can perform Node-B radio functions such as, but not limited to scheduling. Further, a partial Radio network control (RNC) 304 can be employed to perform Radio Resource Control (RRC), radio bearer (RB)/radio access bearers (RABs), radio access network (RAN) quality of service (QoS), call admission control (CAC)/Power/Congestion control, and the like. In accordance with an aspect, a routing component 108 can locally break out Internet and/or home/enterprise network bound traffic. In one aspect, the routing component 108 can include a slave GGSN. Moreover, information packets received from the UE 102 can be analyzed by the routing component 108 and a route to transfer the packets can be determined. In one example, the routing can be based in part on a destination address, source address, type of packet, type of protocol, one or more user and/or service provider defined rules or policies and/or user preferences.

According to an embodiment, a Policy Decision/Policy Enforcement Function (PDF/PEF) 306 can be employed to drive the selection of the route. The PDF/PEF 306 can include multiple policies that can be specified, for example, by a service provider through a management component 308. The management component 308 can be employed to facilitate FAP management (FAP white list, policy rule updates, Ethernet port management, FAP firmware updates, GSN routing function management, performance and alarm status update, etc.). Additionally, the management component 308 can employ Technical Report 069 (TR-69) protocol to communicate with a femto provisioning/management platform in the mobility network. According to an aspect, when a customer installs the femto AP 104, during setup (or at any other time), the management component 308 can facilitate authentication of the femto AP 104 with the mobility network, such that, the service provider can recognizes the femto AP 104 and can ensure that the customer and/or femto AP 104 is legitimate. Further, once the customer and/or femto AP 104 are authenticated, the management component 308 can download configuration information (e.g., service provider policies, rules, definitions) and parameters that can facilitate connection with the core network elements (e.g., GGSN).

In one embodiment, the management component 308 can provide an interface that enables a mobility network operator/service provider/mobility network element to control the local breakout mechanism, for example, by specifying policies in the PDF/PEF. In one example, the management component 308 can also provide mobility network operator/service provider/mobility network element with an override functionality. Moreover, the mobility network operator/service provider/mobility network element can utilize the override functionality to stop local breakout at most any time and/or for a specified time period. Specifically, the override functionality can be employed by a service provide upon legal request and/or for security purposes. For example, a legal/security request can be made (e.g., by a government agency) to monitor communication through a particular FAP and the service provider can utilize the management component 308 to override the breakout mechanisms employed at the FAP, such that all communication at the FAP can be transferred via the mobility network. Moreover, the management component 308, in response to the override command, can disable breakout functionality at the routing component 108 and/or create a policy, which ensures that local breakout is not performed at the FAP 104.

The routing component 108, based in part on factors, such as but not limited to, the analysis, the PDF/PEF, etc., identifies an optimal route for traffic received at the femto AP 104. In one example, when traffic is received from the UE 102, the routing component 108 can identify whether the traffic should be routed to the macro network, via the Iu tunnel, to the Internet via the DH LAN 310, a device/application/service on the DH LAN 310 and/or a disparate UE (not shown) attached to the femto AP 104. Based on the determination, the routing component 108 can deliver the traffic via the identified route. In another example, the routing component 108 can receive traffic from the device on the DH LAN 310 and can determine an optimal route (e.g., to UE 102, or macro network, etc.) for the traffic, for example, by employing one or more policies in the PDF/PEF 306, and route the traffic via the optimal route.

Additionally or alternately, a Network address translation (NAT)/Firewall component 312 (e.g., IPv4) can be employed to map network address information in packet headers that can be routed via the backhaul network and/or the home/enterprise network. Typically, the RG can provision the femtocell with an IP address when the femtocell attaches to the home network, for example DH LAN 310. When the routing component 108 determines that the traffic (e.g., from UE 102) can be routed to the DH LAN 310, the NAT/Firewall component 312 can employ a NAT function to proxy the IP address of UE 102 in a packet header, with a home network domain IP address associated with the DH LAN 310. Similarly, when the routing component 108 determines that the traffic (e.g., from DH LAN 310) can be routed to the UE 102, the NAT/Firewall component 312 can utilize a NAT function to proxy the home domain IP address with the IP address of the UE 102.

Further, the NAT/Firewall component 312 can employ a firewall for intrusion detection and/or prevention for UE 102 to home network traffic and vice versa. Furthermore, the firewall can allow or prevent a device on the DH LAN 310 to access the mobility network through the Iu tunnel. In one aspect, the NAT/firewall component 312 can utilize one or more policies from the PDF/PEF 306 to control access of the mobility network by the device on the DH LAN 310. For example, the firewall can protect the digital home network and prohibit bridging the DH LAN 310 with the Internet through the mobility core network. It can be appreciated that the firewall can be hardware, software, or a combination thereof. In one example, a modem 314 (DSL or most any broadband modem) can be employed for transmission of packets through the backhaul network to the macro RAN. Furthermore, the femto AP 104 can include a security component 316 that can utilize most any encryption technique for secure channel set up and/or tear down and/or encryption of outbound traffic. For example, the security component 316 can perform encryption for establishing the Iu tunnel.

According to an aspect, a continuity component 112 can be utilized to detect when UE 102 is detaching from the femto AP 104. The continuity component 112 can further identify if the UE 102 has an active communication session with a device/application/service on the DH LAN 310 and/or the Internet, for example, facilitated by the routing component 108. If one or more communication sessions exist, the continuity component can determine a current context state associated with the sessions and save the context state, such that the context state can be utilized by an element in the macro network to continue the communication session with the UE 102, when the UE 102 moves into the macro cell. Additionally, in another aspect, the continuity component 112 can detect attachment of UE 102 to the femto AP 104 and determine whether the UE 102 has an ongoing communication session(s) with a device/application/service on the DH LAN 310 and/or the Internet via a macro network. Further, the continuity component 112 can determine a current context state associated with the ongoing communication session(s), for example, stored by an element of the macro network, and can facilitate seamless continuity of the session when the UE 102 attaches to the femto AP 104 from the macro cell. In one aspect, the routing component 108 can facilitate delivery of the remaining communication session, when the UE 102 attaches to the femto AP 104.

Additionally or alternately, the femto AP 104 can include a synchronization component 318 that can be employed to facilitate dynamic synchronization when the UE 102 attaches to the femto AP 104 (and/or on demand). In particular, the synchronization component 318 can manage synchronization of data between a device, application and/or service on the DH LAN 310, and/or a website from the Internet, with an authorized UE, for example, UE 102. In one aspect, an authorized UE, femtocell owner and/or network provider can specify data that can be synchronized when a specific UE 102 attaches to the femto AP 104. In one example, the synchronization component 318 can utilize data from an access control list (ACL) to determine synchronization parameters. In another example, the synchronization component 318 can perform synchronization based on one or more policies. In particular, the synchronization data can be directly routed between the UE 102 and the device, application and/or service on the DH LAN 310, and/or the Internet, by employing the routing component 108.

Figure 4:
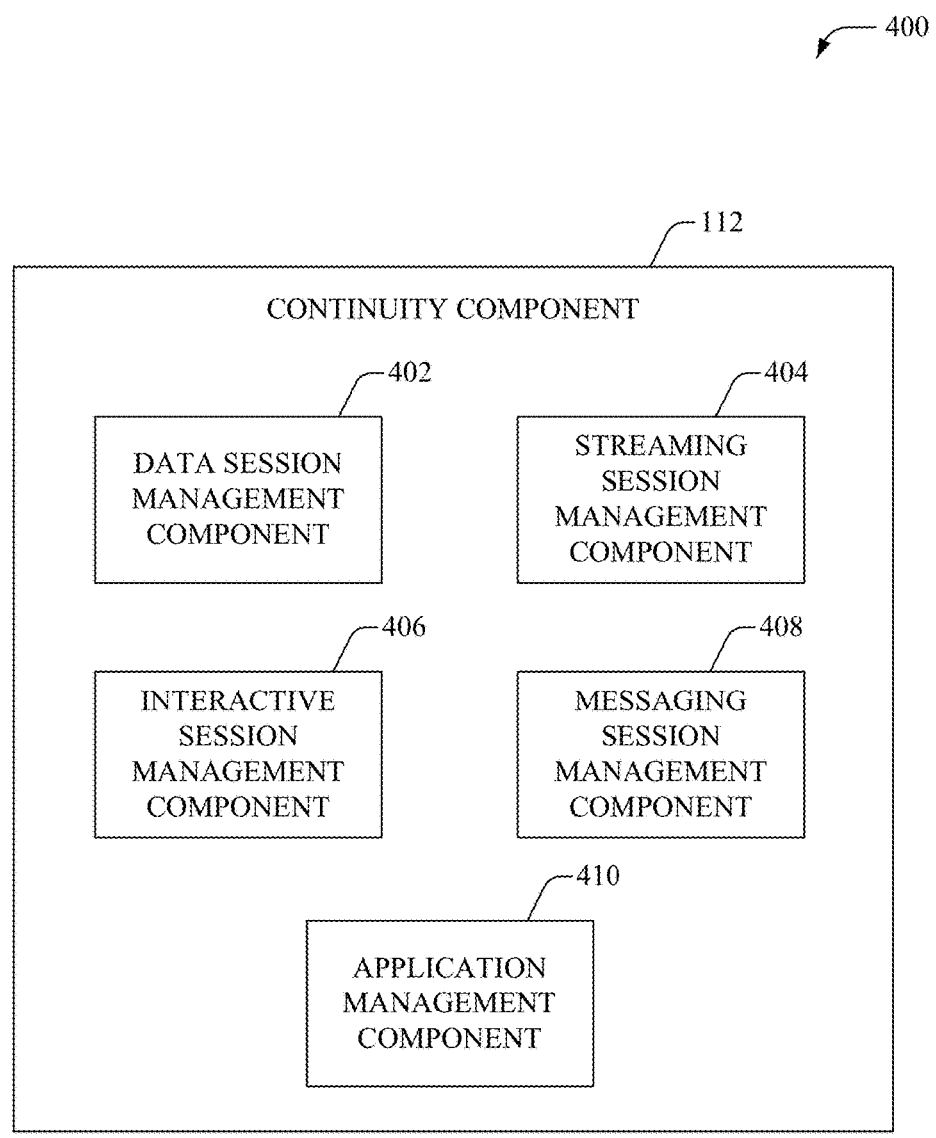
FIG. 4 illustrates an example system that facilitates communication session continuity for a UE associated with a femtocell.

Referring to FIG. 4, there illustrated is an example system 400 that facilitates communication session continuity for a UE associated with a femtocell, according to an aspect of the subject specification. It can be appreciated that the continuity component 112 can include functionality, as more fully described herein, for example, with regard to system 100, 200 and 300. As discussed previously, the continuity component 112 can be employed to maintain seamless communications between a UE and a device/service/application on a DH LAN, or the Internet, when the UE moves between the femto and macro networks.

Typically, the continuity component 112 can include a data session management component 402 that can facilitate maintaining a data communication session associated with the UE, when the UE moves from the femtocell to the macro cell and/or vice versa. In one example a UE attached to a femto AP can directly communicate (e.g., by employing the routing component) with a device, service and/or application of a DH LAN, connected to the femto AP. Additionally or alternately, the UE can directly communicate with the Internet for example, via the DH LAN. The data session management component 402 can monitor the status of a data session associated with the UE when determined that the UE is leaving the femto network. In one example, the determination can be made automatically, for example, by employing a machine learning technique, and/or can be indicated by the UE and/or the user. The data session management component 402 can store the session status information in a database, for example, residing in the femtocell and/or in the macro cell. When the UE moves into the macro cell, the macro network can identify the stored session status and resume the session where it left off.

In another example, when a UE, communicating with the Internet or a device, service and/or application of a DH LAN, connected to a femto AP, moves from the macro cell to the femtocell, the data session management component 402 can determine a current status of the data session, for example, from a local or remote database. In one example, the status of the data session can be stored by various entities, such as but not limited to, the device, service, application and/or a web server, etc. Moreover, the data session management component 402 can utilize the stored status to resume the data session through the femto AP, by employing a local breakout mechanism. For example, a data session between a UE and the Internet can be facilitated in the macro network, and when the UE enters the femtocell, the data session management component 402 can continue the session between the UE and the Internet through the femtocell, by employing local breakout to the Internet at the femto AP.

According to an aspect, a streaming session management component 404 can be utilized to facilitate session continuity for steaming data, such as but not limited to, video, audio, real time data, etc. Further, the streaming session management component 404 can be employed to transfer a streaming session from one device in the femto network to another. For example, a user who is viewing television in his home, for example, connected to the DH LAN can utilize the streaming session management component 404 to transfer the viewing session to his mobile device, for example attached to the femto AP in preparation to leave the house. In one aspect, the streaming session management component 404 can facilitate transferring the streaming session to the UE and ensuring session continuity when the UE moves out of the femto network. The reverse scenario can also be handled by the streaming session management component 404. Accordingly, the streaming session management component 404 can facilitate continuity of a streaming session, between devices and/or networks. It can be appreciated that the transferring of a streaming session can be based in part on various factors, such as, but not limited to, user input, UE location, historical patterns, cost benefit analysis, etc.

In one aspect, an interactive session management component 406 can be utilized to facilitate interactive session continuity between devices and/or networks. As an example, the interactive session management component 406 can transfer an interactive session between one or more UE attached to the femto AP, and a device/application/service of a DH LAN, connected to the femto AP, etc. Moreover, the transfer can be driven, based on a user input, and/or a user preference, service provider policy, UE location, time or date, etc. In addition, when the UE moves outside the femtocell, the interactive session management component 406 can ensure seamless session continuity over the macro network. As an example, the interactive session management component 406 can transfer an interactive session from a gaming module, connected to the DH LAN, to a UE attached to the femto AP, for example, when a user, playing a game prepares to leave the femtocell coverage area. Further, the interactive session management component 406 ensures that the interactive session is continued even when the UE moves into the macro network, for example, by employing macro network resources. It can be appreciated that the interactive session management component 406 can also facilitate communication continuity in a reverse scenario. Similarly, a messaging session management component 408 can be included, which can facilitate seamlessly transferring a messaging session from one device to another (e.g., by employing local breakout at the femto AP) and/or ensuring messaging session continuity, when the devices associated with the messaging session move between the femtocell and macro cell.

Further, an application management component 410 can be employed to ensure continuity during application (e.g., management traffic) transfer. For example, an operation support system (OS) can communicate with a UE, when the UE is attached to the femto AP, for configuring the UE, loading a new version of a server to the UE, etc. During the communication, if the UE moves out of the femto coverage area, the application management component 410 can ensure that the OS can complete the configuration, update and/or download, via the macro network. Accordingly, the continuity component 112 can facilitate continuity during communication with most any source application, for example, sourced in the UE, the DH LAN, the macro network, etc. As an example, the source application can exchange files, messages, and/or most any content. Further, the communication traffic can be session-based (e.g., Voice over Internet Protocol) or transactional (e.g., messaging and/or file transfer).

Figure 5:
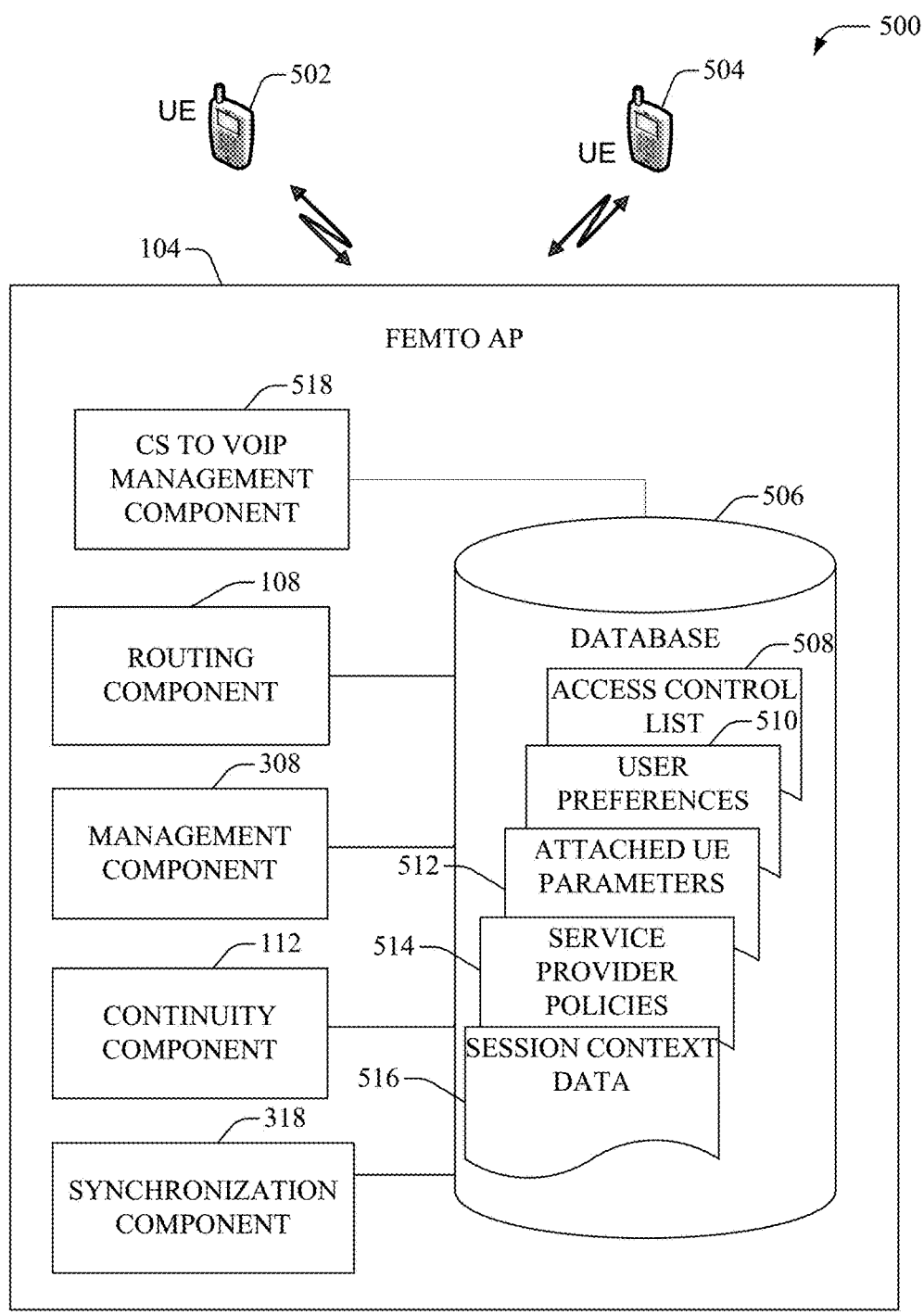
FIG. 5 illustrates an example system that facilitates circuit switched (CS) media breakout and continuity within a femtocell.

Referring to FIG. 5, there illustrated is an example system 500 that facilitates UE-to-UE CS media breakout and continuity within a femtocell in accordance with an aspect of the subject disclosure. It can be appreciated that the routing component 108, management component 308, continuity component 112, synchronization component 318, and femto AP 104 can include functionality, as more fully described herein, for example, with regard to system 100, 200, 300 and 400.

One or more UEs (502, 504) can attach to the femto AP 104 when the UEs (502, 504) are within the coverage area of the femto AP 104, for example, by employing most any attachment procedure. It can be appreciated that the femto AP 104 can utilize an authentication and/or authorization technique to prevent unauthorized attachments. For example, the femto AP 104 can manage access to femtocell services through access control list(s) 508, e.g., white list(s) or black list(s). Such access control list(s) 508 can be configured through various apparatuses and in various modes, e.g., interactively or automatically, which facilitates access management of access to femtocell coverage. As an example, white list(s) includes a set of UE(s) identifier numbers, codes or tokens, and can also include additional fields that can contain information respectively associated with communication devices to facilitate femtocell access management based at least in part on desired complexity; for example, an additional field in a white list can be a logic parameter that determines whether an associated identifier is available for dissemination across disparate white lists. Values of attribute fields that determine white list(s), black list(s), or white list profile(s) can be generated through various sources. The management component 308 can facilitate generation and maintenance of white list(s), black list(s), or white list profile(s).

In addition, the management component 308 can be employed to create, update and/or delete information that facilitates routing and/or authentication, which can be stored in database 506. Although database 506 is shown to reside within the femto AP 104, it can be appreciated that database 506 can be a local, a remote, and/or a distributed database. In one example, the database 506 can be substantially similar to and/or the same as database 206 (FIG. 2). The database 506 can be employed to store information such as, but not limited to, access control list 508, user preferences 510, attached UE parameters 512, service provider policies 514 and/or session context data 516. The service provider policies 514 can typically include one or more policies associated with routing and/or breakout at the femto AP 104. In addition, the service provider policies 514 can include the PDF/PEF that can drive the selection of an optimal route, for example, by the routing component 108. Further, the attached UE parameters 512 can provide a list of currently attached UEs (502, 504) and can typically include information (e.g., device ID, SIM, USIM, a mobile number, etc.) associated with the UEs (502, 504) that are currently attached to the femto AP 104.

In one example, when UE 502 initiates a call, the routing component 108 can analyze the CS traffic from the UE 502 and determine an optimal path to route the call. As an example, the routing component 108 can analyze information stored in the database 506, such as, but not limited to user preferences 510, attached UE parameters 512 and/or service provider policies 514, to determine the optimal path. In one aspect, the routing component 108 can verify whether the destination device for the CS call is attached to the femto AP 104, for example, by employing information from the attached UE parameters 512. When the routing component 108 determines that the destination entity is not attached to the femto AP 104, the routing component 108 can direct the call to the macro network via the backhaul network. Alternately, when the routing component 108 determines that the destination entity is attached to the femto AP 104, for example, if the destination entity is UE 504, the routing component 108 can facilitate CS media breakout at the femto AP 104 and facilitate communication between the UE 502 and UE 504 without routing the call through the macro network. It can be appreciated that when one of or both the UEs move out of the femtocell coverage area, service continuity can be established, by the continuity component 112, and the call can be routed via the macro network. Further, it can be appreciated that the routing component can transmit data indicating the CS media breakout to the core mobility network (e.g., that can be utilized for billing and/or records, etc.)

Traditionally, when the UE (502, 504) attaches to the femtocell, an active CS call continue via base audio unit (BAU) except for the transport path of the traffic, which is routed through a home broadband service. According to an embodiment, the femto AP 104 can further include a CS to VoIP management component 518 that facilitates converting the active CS call to a VoIP call, without customer interaction, to release CS resources in the network. Moreover, the VoIP call can be routed by employing breakout mechanisms at the femto AP 104. For example, a CS call from a UE (502, 504) can be converted to a VoIP call and routed to the Internet via DH LAN (310, FIG. 3), without utilizing core mobile network resources.

Figure 6:
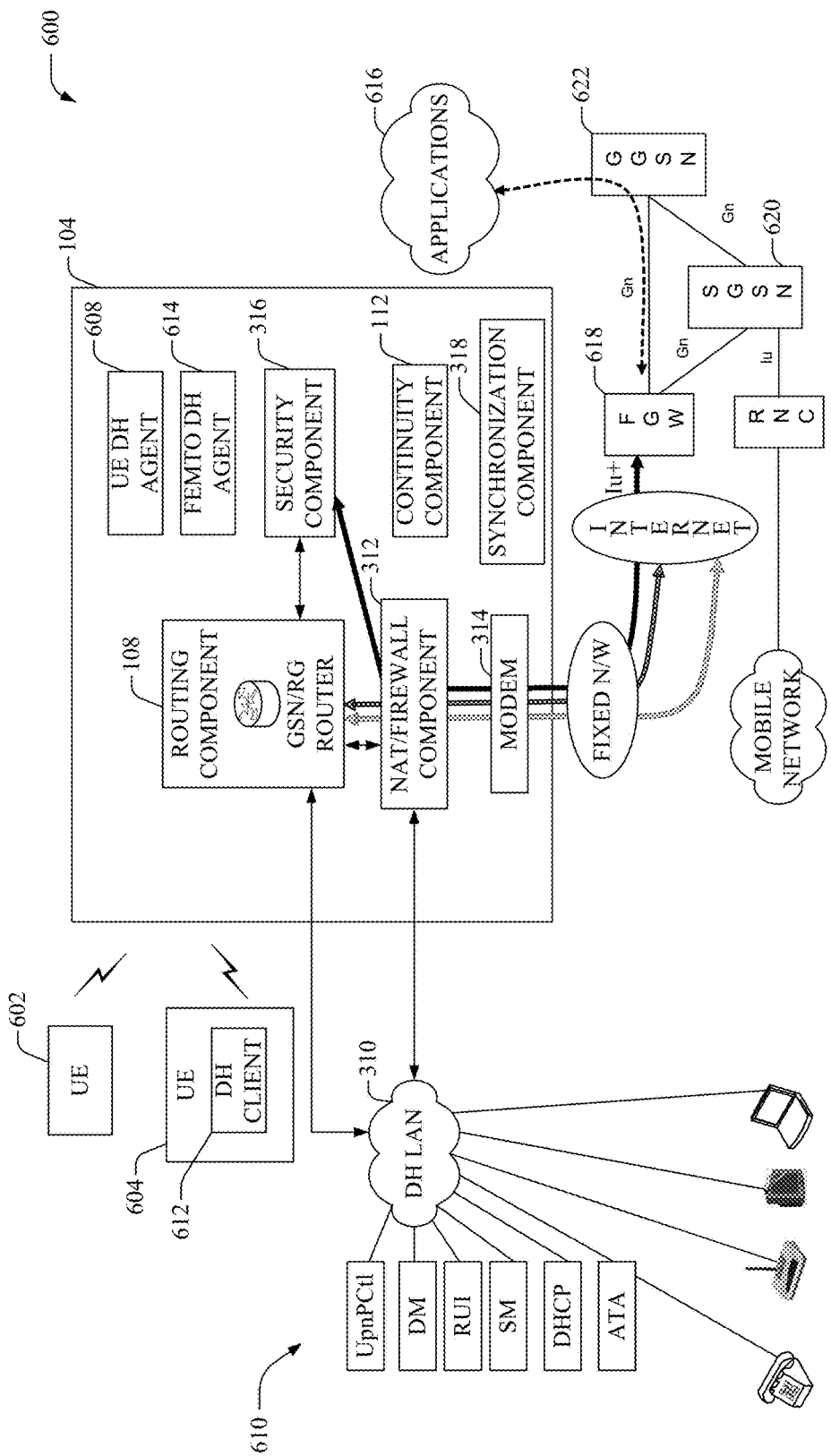
FIG. 6 illustrates an example system that provides service continuity during home services integration with a femtocell, according to an aspect of the subject disclosure.

FIG. 6 illustrates an example system 600 that provides service continuity during home services integration with a femtocell, according to an aspect of the subject disclosure. Typically, system 600 can include a femto AP 104 that can comprise an integrated and/or external RG. It can be appreciated that the routing component 108, NAT/Firewall component 312, modem 314, security component 316, continuity component 112, synchronization component 318 and femto AP 104 can include functionality, as more fully described herein, for example, with regard to system 100, 200, 300, 400 and 500. Additionally, it can be appreciated that femto AP 104 can include components (e.g., HNB, partial RNC, management component, PDF/PEF, etc.) as illustrated in FIG. 3 and described herein with respect to system 300.

According to an embodiment, the routing component 108 can facilitate communication between a UE (602, 604) and one or more devices 606 on the DH LAN 310. Typically, device 606 can be most any device on the DH LAN 310, such as, but not limited to, a telephone, a printer, a laptop, an appliance, a television, a projector, a gaming module, music player, etc. Thus, the UE (602, 604) can join the LAN (e.g., home network), without supporting a dual mode wireless/Wi-Fi functionality. In addition, the routing component 108 can directly route Internet bound packets to the Internet, without transferring the packets to the core network. Further, the routing component 108 can identify communication directed to a device on the LAN and route the communication directly to the destination via the DH LAN 310. In one aspect, the continuity component 112 can maintain communication session(s) via the macro network when the UE (602, 604) detach from the femto AP 104.

According to an embodiment, the femto AP 104 can include a UE DH agent 608 that can facilitate communication between UE 602 and a device 606 on the DH LAN 310. In one aspect, the UE DH agent 608 can identify when a UE 602 attaches to the femto AP 104 and can communicate the presence of the UE 602 to the DH functions. Similarly, the UE DH agent 608 can identify when the UE 602 leaves the femtocell and accordingly communicate the absence of the UE 602 to the DH functions. Moreover, the UE DH agent 608 can perform mapping to provide DH functions to the UE 602. Specifically, the UE DH agent 608 can make the UE 602 appear as a DH compliant device in the DH LAN 310. In accordance with an aspect, the UE DH agent 608 can provide an authorized UE with DH services 610, such as, but not limited to, Digital Rights management (DRM), Remote User Interface (RUI), Dynamic Host Configuration Protocol (DHCP), session management (SM), Universal Plug and Play (UPnP), Analog Terminal Adapter (ATA).

Moreover, the UE DH Agent 608 can offload traffic to the broadband access network. For example, UE traffic to/from the Internet can be routed directly to the Internet service provider (ISP) and the DH LAN 310, and can bypass the GSN. Accordingly, the UE DH agent 608 can route signaling and/or media to and/or from the DH LAN 310 in an efficient manner, avoiding hairpinning (e.g., tromboning). In an additional aspect, the UE DH agent 608 can utilize the continuity component 112 to facilitate session continuity for traffic between the UE 602 and select DH LAN services 610 and/or devices 606, when the UE 602 moves from the femtocell to the macro cell and vise versa.

It can be appreciated that the UE DH agent 608 can be located within the femtocell and/or can be located within a UE, for example the DH client 612 in UE 604. In particular, the DH client 612 can include functionality substantially similar to that of the UE DH agent 608. Moreover, the DH Client 612 can be a device-specific Digital Home compliant client, residing in the UE, for delivering DH services to the UE. It can be appreciated that although only one DH client 612 is illustrated in UE 614, one or more DH clients may reside in UE 604, each with the same or different functionality. In one aspect, the DH Client 612 can enhance user experience beyond that which can be provided with the UE DH Agent 608, for example, based on UE specifications and/or user preferences.

Further, the femto AP 104 can include a femto DH Agent 614 that can be employed to authenticate the femto AP 104 with the home network. For example, the femto DH Agent 614 can facilitate attaching, detaching and establishing its presence in the DH LAN 310. In addition, the femto DH Agent 614 can facilitate wireline and/or wireless convergence by inter-working between the DH functions 610 and mobility applications 616. For example, the femto DH Agent 614 can facilitate location assisted cellular services by obtaining location of the femto AP 104 from a function, application, database, and/or device attached to the DH LAN 310 and providing it to the mobility location servers. In one aspect, the data (e.g., location data, registration data, authorization data, etc.) obtained by the femto DH agent 614 can be utilized by the continuity component 112 to determine when the UE (602, 604) will change networks. Additionally or alternately, the femto DH Agent 614 can assist a mobile core charging function for measuring Internet traffic breakout at the femto AP 104. Further, the femto DH Agent 614 can provide traffic breakout information to a service provider billing system (not shown).

Further, in one example, a DSL network can be employed, by the femto AP 104, as the transport media to connect to the femto gateway (FGW) 618 located at the edge of the mobility core network. The conventional Iu traffic consisting of the Circuit Switched (Iu-cs) voice traffic and Packet Switched (Iu-ps) data traffic together with Femto signaling can be transported between the Femtocell and Femto Gateway in a secure channel. Moreover, the Iu over IP protocol can be referred to as Iu+. In order to facilitate a fast radio link layer control, functions of conventional RNC can be split between and integrated into femto AP 104 and femto gateway 618. Functions such as radio bearer management and radio QoS management can be included in the femto AP 104 (e.g., by employing partial RNC 304); and functions of GPRS Tunneling Protocol (GTP) tunnel management, femtocell authentication, mobility management and/or handover control can be integrated into the FGW 618. In one example, the FGW 618 can aggregate regional femtocells' traffic and tunnel the traffic to the core network. The conventional circuit switched (CS) traffic is routed to a Mobile Switching Center (MSC) and the packet switched (PS) traffic is routed to a Serving GPRS Support Node (SGSN) 620 and Gateway GPRS Support Node (GGSN) 622.

Figure 7:
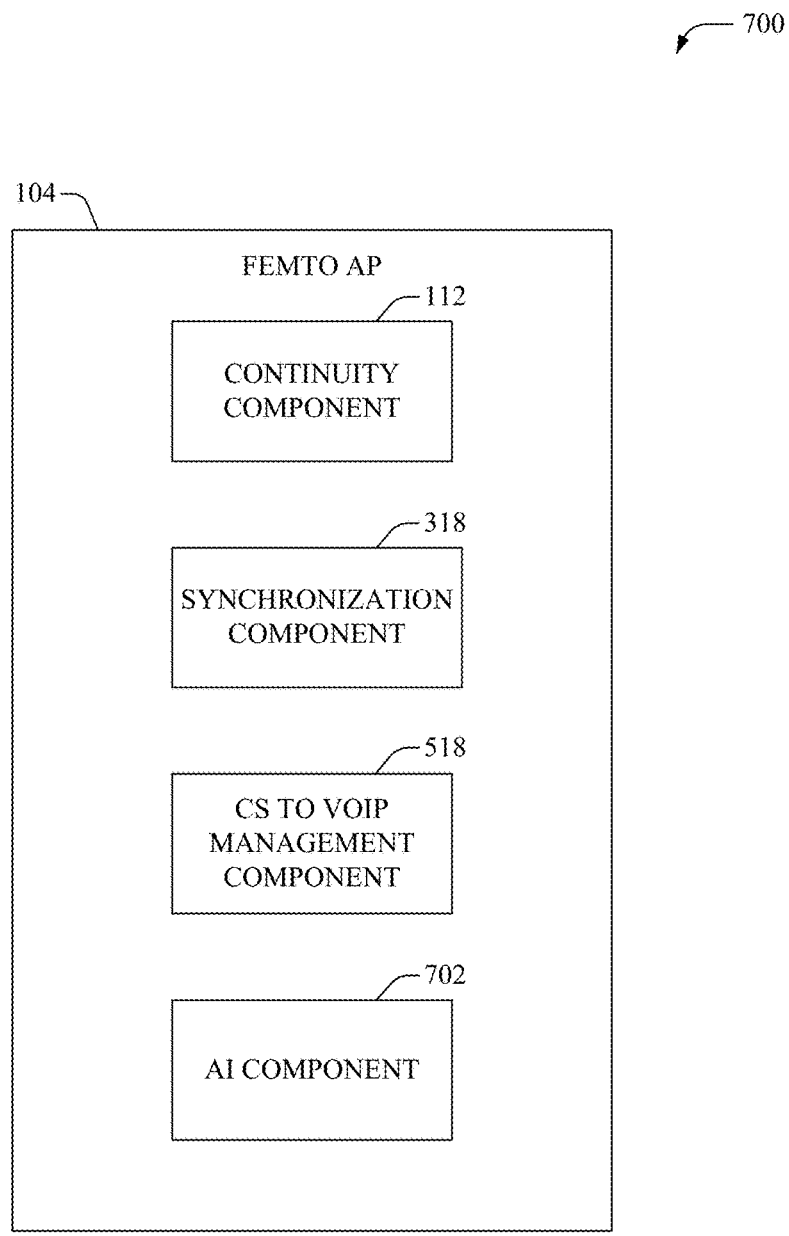
FIG. 7 illustrates an example system that facilitates automating one or more features in accordance with the subject innovation.

FIG. 7 illustrates an example system 700 that employs an artificial intelligence (AI) component 702, which facilitates automating one or more features in accordance with the subject innovation. It can be appreciated that the continuity component 112, synchronization component 318, CS to VoIP management component 518, and femto AP 104 can include respective functionality, as more fully described herein, for example, with regard to systems 100-600.

The subject innovation (e.g., in connection with routing, providing service continuity, detecting change in network, etc.) can employ various AI-based schemes for carrying out various aspects thereof. For example, a process for network and/or device transfer determination by the continuity component 112 can be facilitated via an automatic classifier system and process. Moreover, where the continuity component 112 can ensure communication session continuity, the classifier can be employed to determine when a UE can move between networks, and/or devices.

A classifier is a function that maps an input attribute vector, $x=(x_1, x_2, x_3, x_4, x_n)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of communication systems, for example, attributes can be information within the packet headers or other data-specific attributes derived from the information within the packet headers, and the classes can be categories or areas of interest (e.g., levels of priorities).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria whether the UE is moving from a femtocell to a macro cell, whether the UE is moving from the macro cell to the femto cell, whether a communication session can be transferred from one UE to another, etc. The criteria can include, but is not limited to, UE location, session context data, the type of active session, the importance (e.g., priority) of the active session, historical patterns, UE behavior, user preferences, service provider preferences and/or policies, femto AP parameters, etc.

FIGS. 8-11 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
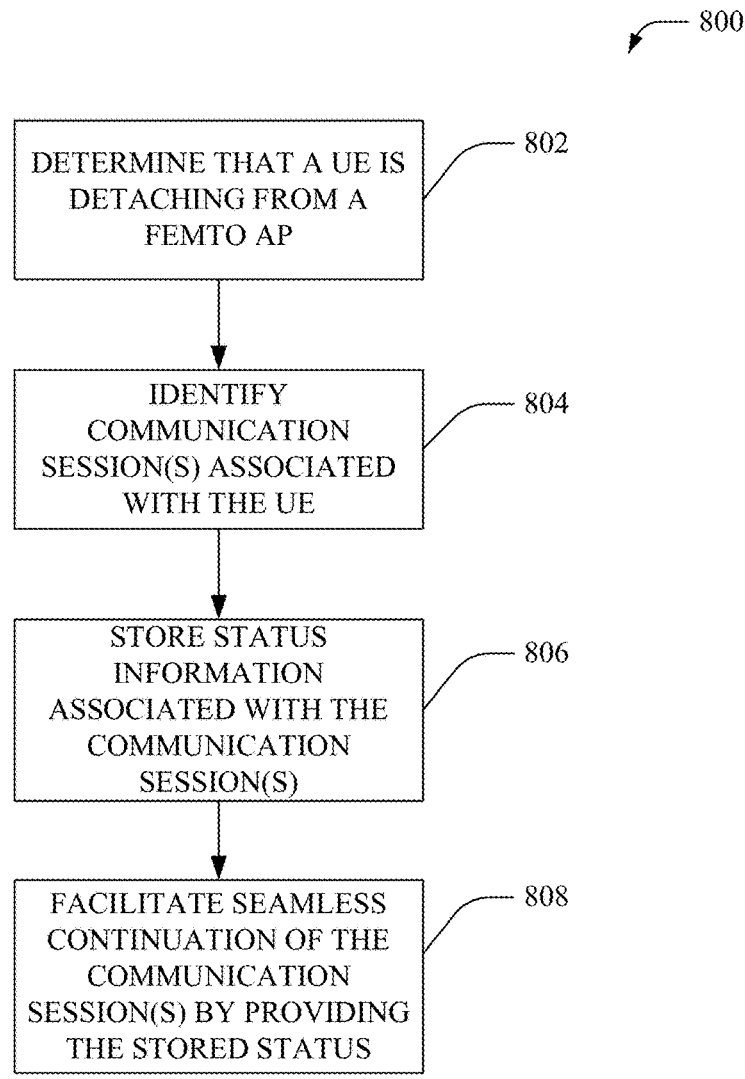
FIG. 8 illustrates an example methodology that can restore a communication session when a UE switches to a macro network from a femto network.

Referring now to FIG. 8, illustrated is an example methodology 800 that can restore a communication session when a UE switches to a macro network from a femto network in accordance with an aspect of the subject disclosure. Typically, the communication session can include, but is not limited to, a data communication session, an interactive communication session, a streaming communication session, a messaging communication session, etc. Moreover, the communication session can be delivered in various delivery types (e.g. real-time, near real time, progressive download or download) and/or utilizing various delivery methods. In one aspect, a source application associated with the session can reside in the UE attached to a femto AP, a device on a LAN attached to the femto AP and/or the internet.

At 802, it can be determined that the UE is detaching from the femto AP. In one example, various factors, such as, but not limited to, user input, registration information, UE location, UE motion, UE behavior, user preferences, service provider policies, day, date, time, historical patterns, machine learning techniques, etc. can be utilized for the determination. At 804, communication session(s) associated with the UE can be determined. In one aspect, the UE can communicate, by employing local breakout at the femto AP, with a device, application and/or service of the LAN, and/or the Internet. If the UE is part of one or more active communication sessions, then at 806, status information associated with the communication session(s) can be stored. As an example, the status information can include a point up to which the communication session has been completed. In one aspect, the status information can be stored on a local or remote database (e.g., within the femto or macro network).

At 808, seamless continuation of the communication session(s) can be facilitated by providing the stored status information, for example, to an element on the macro network. Accordingly, the communication session(s) can be resumed from a point where they had previously stopped, over the macro network. Thus, re-delivery of the previously communicated information can be avoided and the remaining information can be exchanged efficiently on the macro network.

Figure 9:
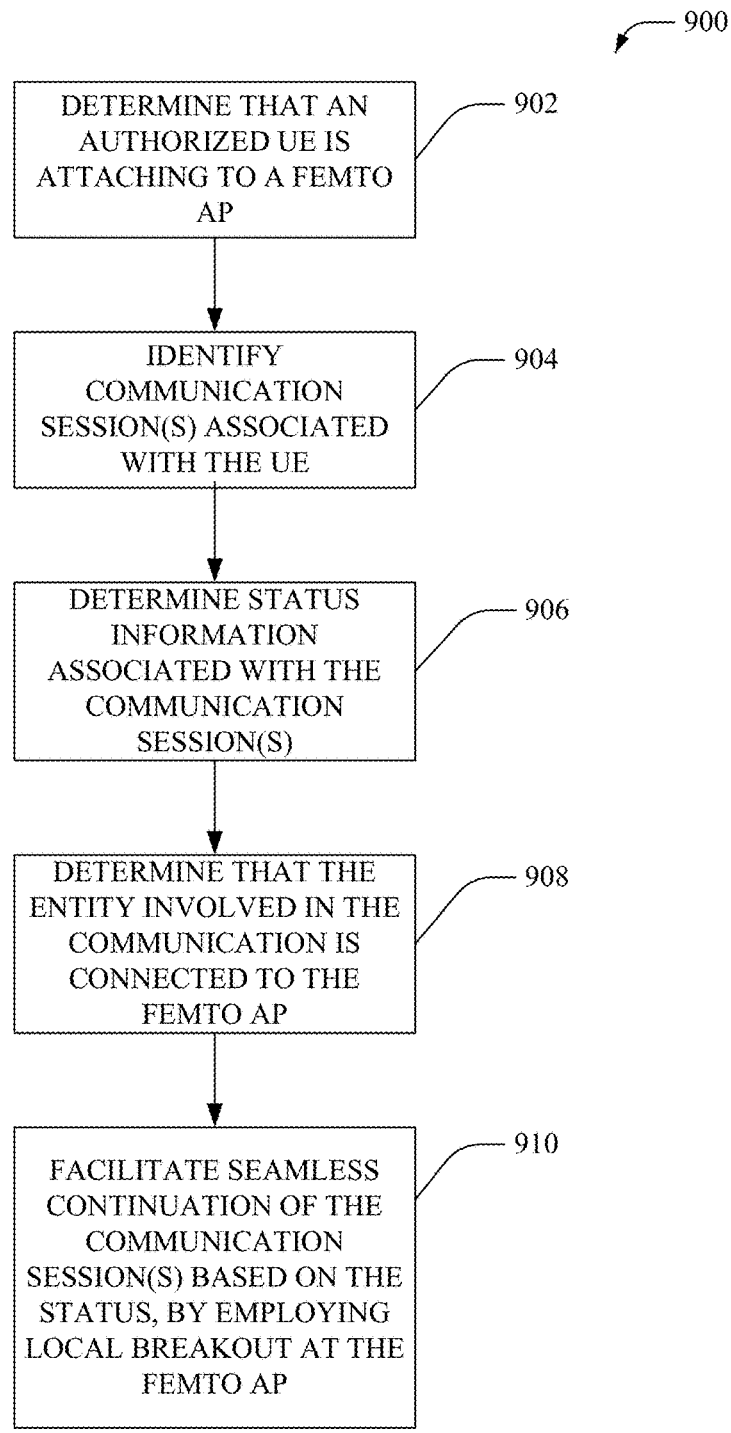
FIG. 9 illustrates an example methodology that that can be employed to resume a communication session when a UE switches to a femto network from a macro network.

FIG. 9 illustrates an example methodology 900 that can be employed to resume a communication session when a UE switches to a femto network from a macro network, according to an aspect of the subject disclosure. In one aspect, an authorized UE that enters a coverage area of a femto access point (FAP), from a macro network, can attach to the FAP by employing most any attachment procedure. Typically, the UE can include, but is not limited to, a cellular phone, a personal digital assistant (PDA), a laptop, a personal computer, a media player, a gaming console, and the like.

At 902, it can be determined that an authorized UE is attaching to the femto AP. In one example, various factors, such as, but not limited to, user input, registration information, UE location, UE motion, UE behavior, user preferences, service provider policies, day, date, time, historical patterns, machine learning techniques, etc. can be utilized for the determination. At 904, active communication session(s) associated with the UE can be determined. According to an example, the active communication sessions can include most any communication session between the UE and a disparate UE connected to the femto AP, a device/service/application of a LAN connected to the femto AP, or the Internet. At 906, status information associated with the communication session(s) can be determined. For example, the status information can be retrieved from a remote and/or local database. In one aspect, the status information can be stored in the remote and/or local database, when determined that the UE is moving from the macro network to the femto network. As an example, the status information can include data that indicates a point at which a communication session can resume.

At 908, it can be determined that an entity associated with the communication session is connected to the femto AP. For example, the entity can be a disparate UE attached to the femto AP, a device, application or service of a DH LAN connected to the femto AP, and/or the Internet (e.g., connected to the femto AP via the DH LAN). At 910, seamless continuation of the communication session(s) can be facilitated based on the status information and by employing local breakout at the femto AP. In one aspect, the local breakout can directly exchange information between the UE and the entity, without employing macro network resources.

Figure 10:
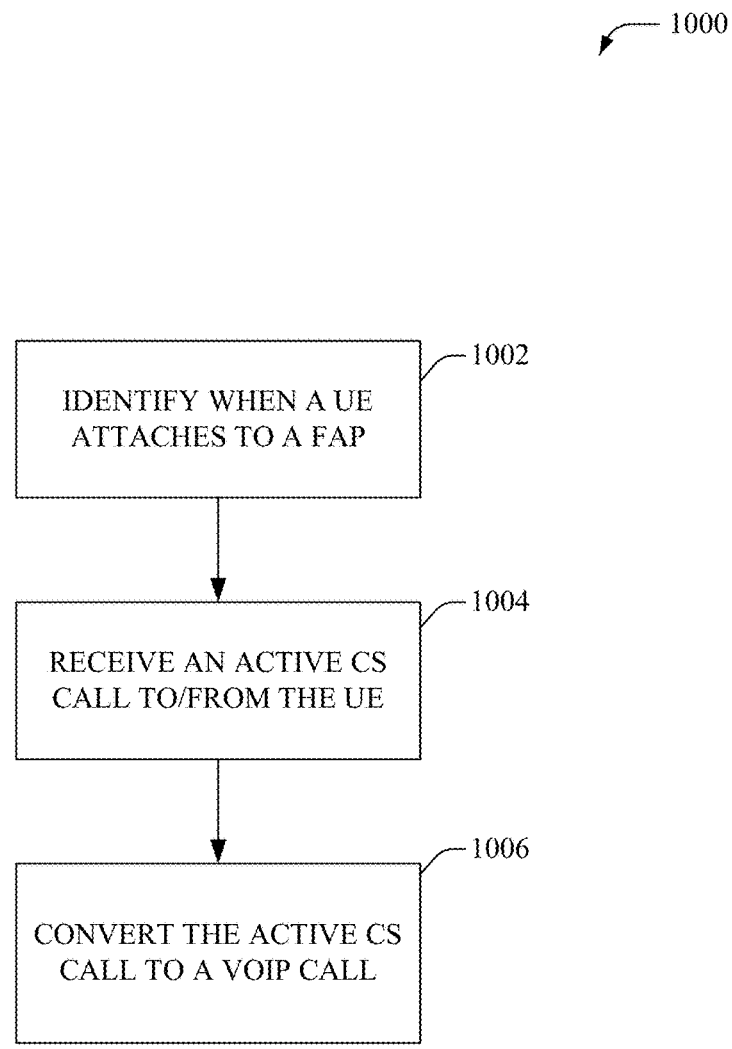
FIG. 10 illustrates an example methodology that facilitates CS continuity to and/or from Voice over Internet Protocol (VoIP), according to an aspect of the subject disclosure.

FIG. 10 illustrates an example methodology 1000 that facilitates CS continuity to and/or from VoIP, according to an aspect of the subject disclosure. At 1002, a UE attachment to a femto AP is identified. At 1004, an active CS call can be received to and/or from the UE. At 1006, the active CS call can be converted to a VoIP call to release CS resources in the communication network. As an example, the conversion can be performed automatically, without user interaction and/or user input. In one aspect, the conversion can be performed by employing one or more machine learning techniques.

Figure 11:
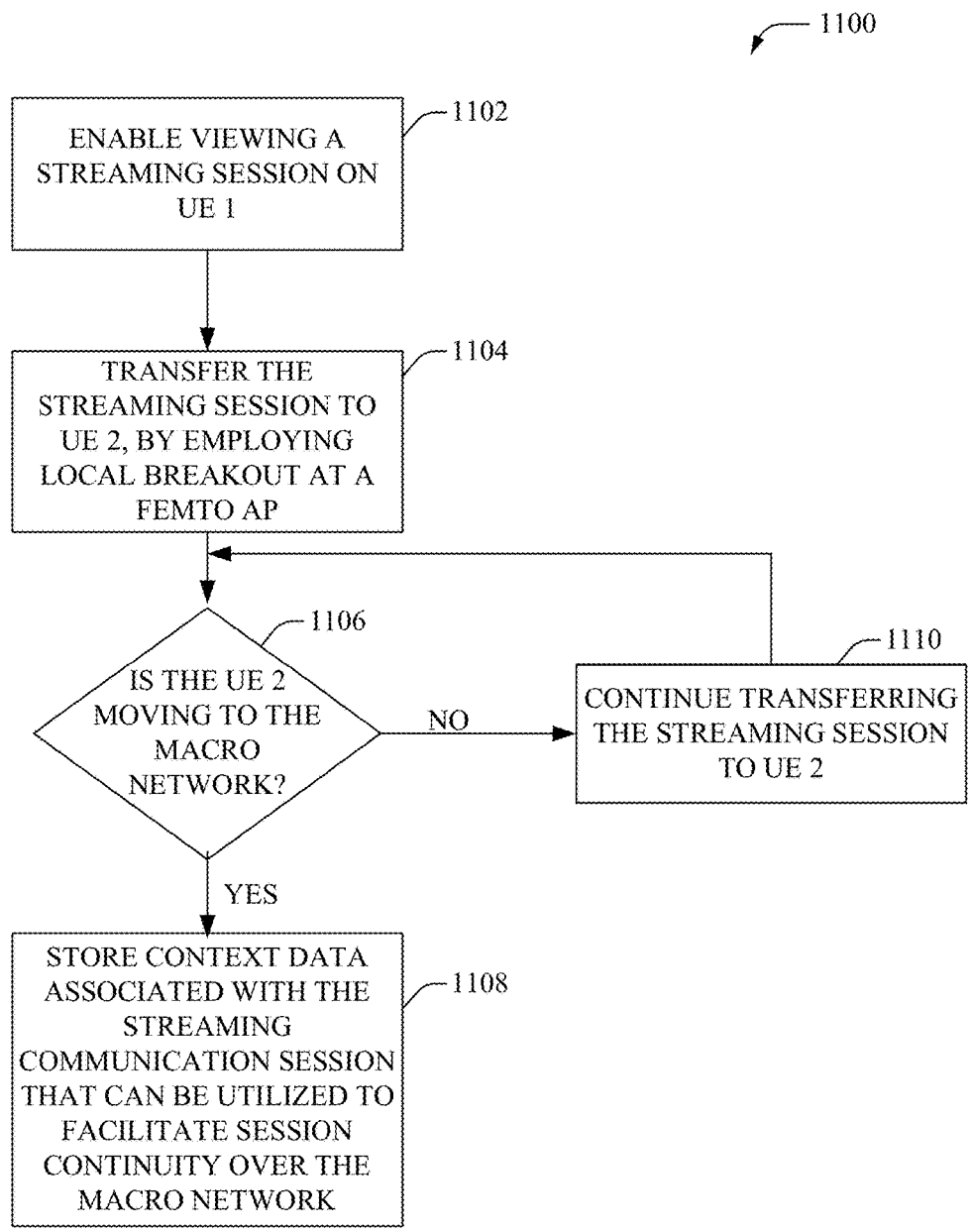
FIG. 11 illustrates an example methodology that facilitates streaming communication session continuity between devices and networks, according to an aspect of the subject disclosure.

Referring to FIG. 11, there illustrated is an example methodology 1100 that facilitates streaming communication session continuity between devices and networks in accordance with an aspect of the subject specification. At 1102, viewing of a streaming session can be enabled on a UE 1. In one aspect, the UE 1 can be most any UE attached to the femto AP, or a device on a DH LAN connected to the femto AP. For example, streaming video from a camera connected to the DH LAN can be viewed on a television connected to the DH LAN. In another example, the streaming video can be transferred to a mobile device attached to the femto AP, by employing a local breakout mechanism. At 1102, the streaming communication session can be transferred to a UE 2, for example, connected to the femto AP, by employing a local breakout mechanism at the femto AP. In one example, the camera output viewed on the television, for example, connected to the DH LAN, can be transferred to a mobile device, for example attached to the femto AP in preparation of a user to leave the house. It can be appreciated that the transferring of a streaming session can be based in part on various factors, such as, but not limited to, user input, UE location, historical patterns, cost benefit analysis, etc. In one aspect, the streaming session can be transferred seamlessly from one device to another without disrupting continuity.

According to an embodiment, at 1106 it can be determined whether the UE 2 is moving to a macro network. At 1108, context data associated with the streaming communication session can be stored at a database, which can be utilized to facilitate session continuity over the macro network, when determined that the UE 2 is moving to the macro network. Alternately, at 1110, the streaming session can be transferred to the UE 2, via the femto network, if determined that the UE 2 is not moving into the macro network.

Figure 12:
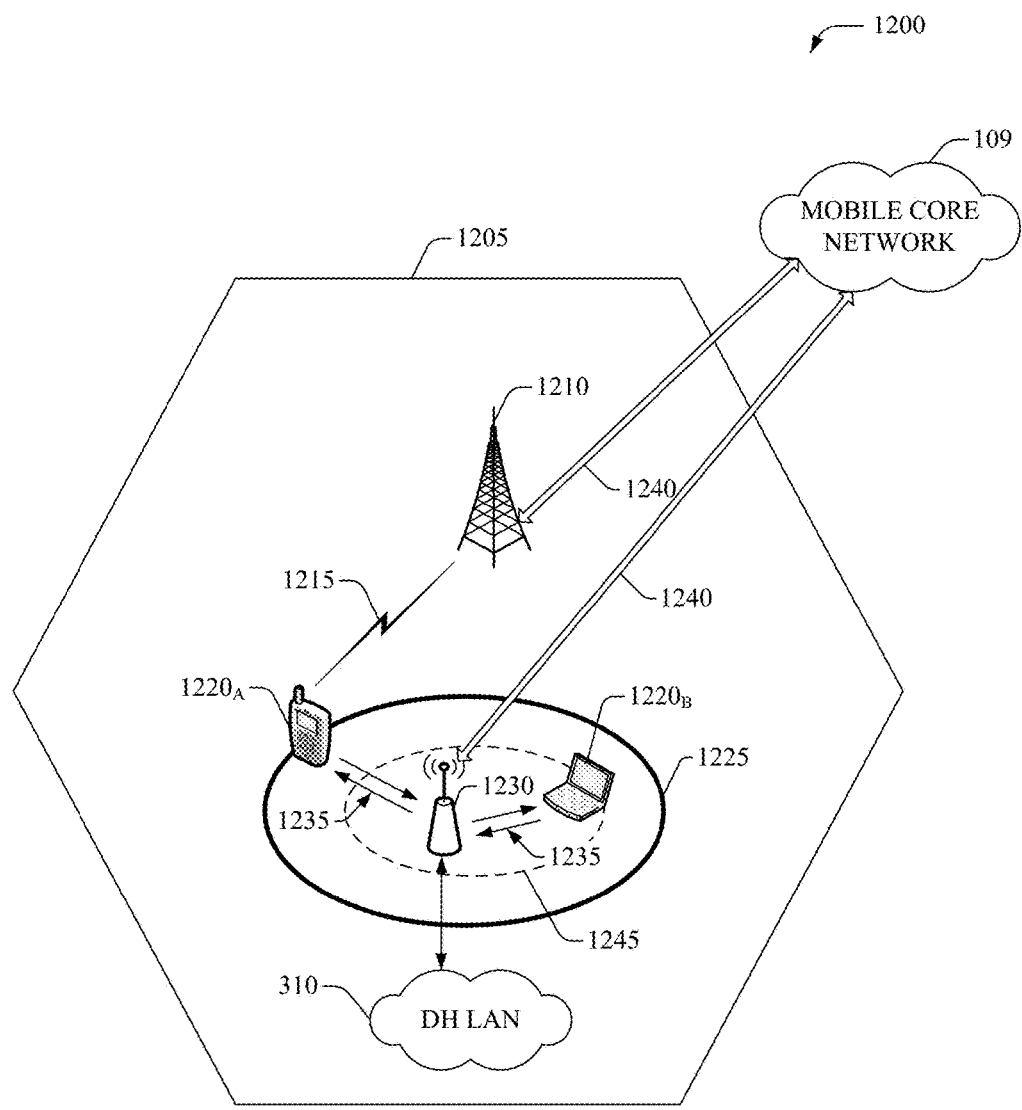
FIG. 12 illustrates an example wireless communication environment with associated components for operation of a femtocell in accordance with the subject specification.

FIG. 12 illustrates a schematic wireless environment 1200 (e.g., a network) in which a femtocell can exploit various aspects of the subject innovation in accordance with the disclosed subject matter. In wireless environment 1200, area 1205 can represent a coverage macro cell, which can be served by base station 1210. Macro coverage is generally intended for outdoors locations for servicing mobile wireless devices, like UE 1220$_A$, and such coverage is achieved via a wireless link 1215. In an aspect, UE 1220 can be a 3GPP Universal Mobile Telecommunication System (UMTS) mobile phone.

Within macro coverage cell 1205, a femtocell 1245, served by a femto access point 1230, can be deployed. A femtocell typically can cover an area 1225 that is determined, at least in part, by transmission power allocated to femto AP 1230, path loss, shadowing, and so forth. Coverage area typically can be spanned by a coverage radius that ranges from 20 to 50 meters. Confined coverage area 1245 is generally associated with an indoors area, or a building, which can span about 5000 sq. ft. Generally, femto AP 1230 typically can service a number (e.g., a few or more) wireless devices (e.g., subscriber station 1220$_B$) within confined coverage area 1245. In an aspect, femto AP 1230 can integrate seamlessly with substantially any PS-based and CS-based network; for instance, femto AP 1230 can integrate into an existing 3GPP Core via conventional interfaces like Iu-CS, Iu-PS, Gi, Gn. In another aspect, femto AP 1230 can exploit high-speed downlink packet access in order to accomplish substantive bitrates. In yet another aspect, femto AP 1230 has a LAC (location area code) and RAC (routing area code) that can be different from the underlying macro network. These LAC and RAC are used to identify subscriber station location for a variety of reasons, most notably to direct incoming voice and data traffic to appropriate paging transmitters.

As a subscriber station, e.g., UE 1220$_A$, leaves macro coverage (e.g., cell 1205) and enters femto coverage (e.g., area 1215), as illustrated in environment 1200, UE 1220$_A$ can attempt to attach to the femto AP 1230 through transmission and reception of attachment signaling, effected via a FL/RL 1235; in an aspect, the attachment signaling can include a Location Area Update (LAU) and/or Routing Area Update (RAU). Attachment attempts are a part of procedures to ensure mobility, so voice calls and sessions can continue even after a macro-to-femto transition or vice versa. It is to be noted that UE 1220 can be employed seamlessly after either of the foregoing transitions. Femto networks are also designed to serve stationary or slow-moving traffic with reduced signaling loads compared to macro networks. A femto service provider (e.g., an entity that commercializes, deploys, and/or utilizes femto AP 1230) therefore can be inclined to minimize unnecessary LAU/RAU signaling activity at substantially any opportunity to do so, and through substantially any available means. It is to be noted that substantially any mitigation of unnecessary attachment signaling/control can be advantageous for femtocell operation. Conversely, if not successful, UE 1220 generally can be commanded (through a variety of communication means) to select another LAC/RAC or enter "emergency calls only" mode. It is to be appreciated that this attempt and handling process can occupy significant UE battery, and femto AP capacity and signaling resources as well.

When an attachment attempt is successful, UE 1220 can be allowed on femtocell 1225 and incoming voice and data traffic can be paged and routed to the subscriber station through the femto AP 1230. It is to be noted also that data traffic is typically routed through a backhaul broadband wired network backbone 1240 (e.g., optical fiber backbone, twisted-pair line, T1/E1 phone line, DSL, or coaxial cable). It is to be noted that as a femto AP 1230 generally can rely on a backhaul network backbone 1240 for routing, signaling and paging. Namely, packet flows established for wireless communication devices (e.g., terminals 1220$_A$ and 1220$_B$) served by femto AP 1230, and for devices served through the backhaul network pipe 1240. It is to be noted that to ensure a positive subscriber experience, or perception, it is desirable for femto AP 1230 to maintain a high level of throughput for traffic (e.g., voice and data) utilized on a mobile device for one or more subscribers while in the presence of external, additional packetized, or broadband, traffic associated with applications (e.g., web browsing, data transfer (e.g., content upload), and the like) executed in devices within the femto coverage area (e.g., area 1225 or area 1245).

It can be appreciated that the femto AP 1230 can be substantially similar to femto AP 104 and include functionality, more fully described herein, for example, with respect to systems 100-700. In particular, femto AP 1230 can include a continuity component 112 (not shown), which can facilitate session continuity when UE (1220$_A$ and 1220$_B$), move between macro coverage area 1205 and femto coverage area 1225.

Figure 13:
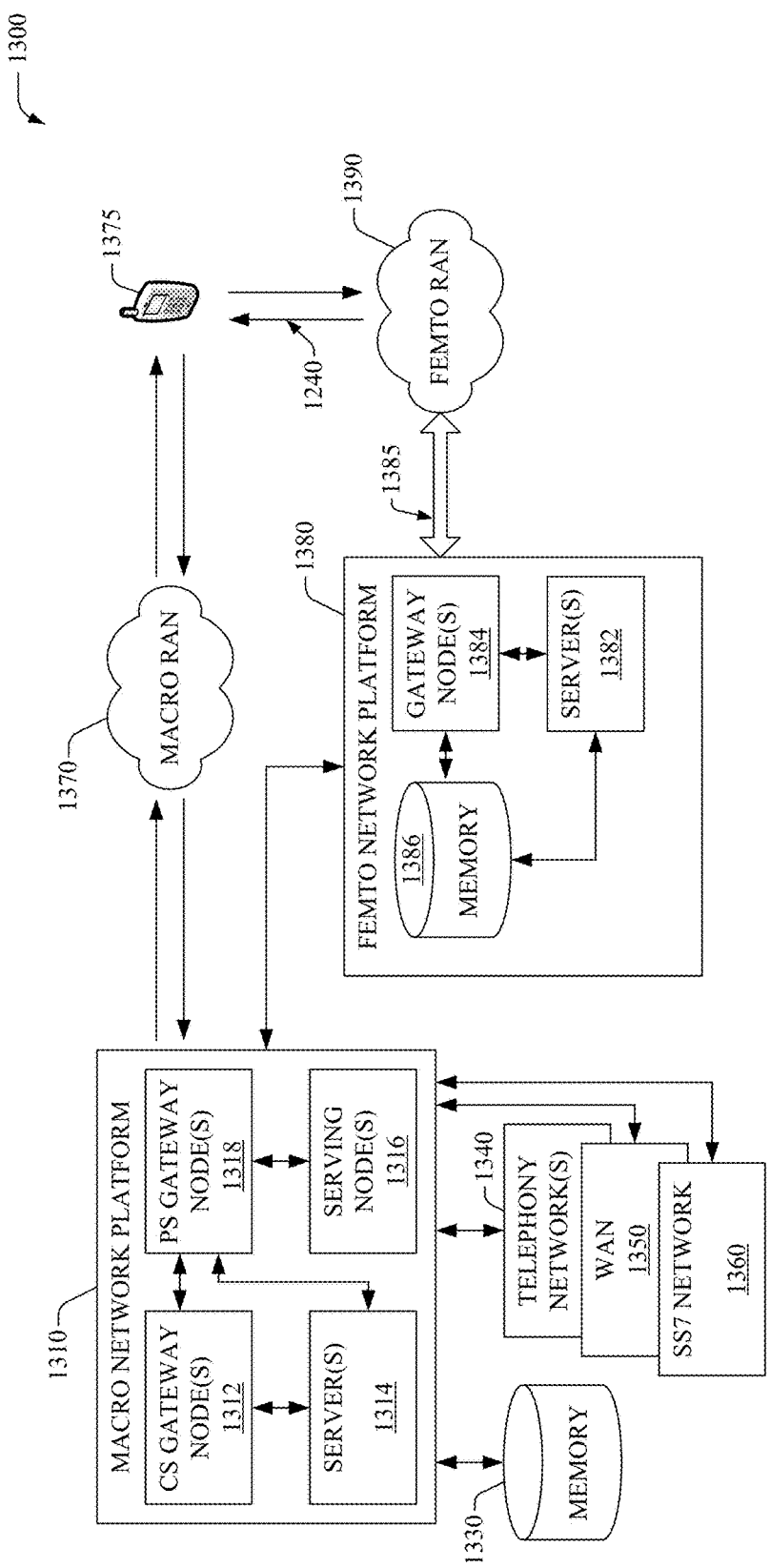
FIG. 13 illustrates a schematic deployment of a macro cell and a femtocell for wireless coverage in accordance with aspects of the disclosure.
Figure 14:
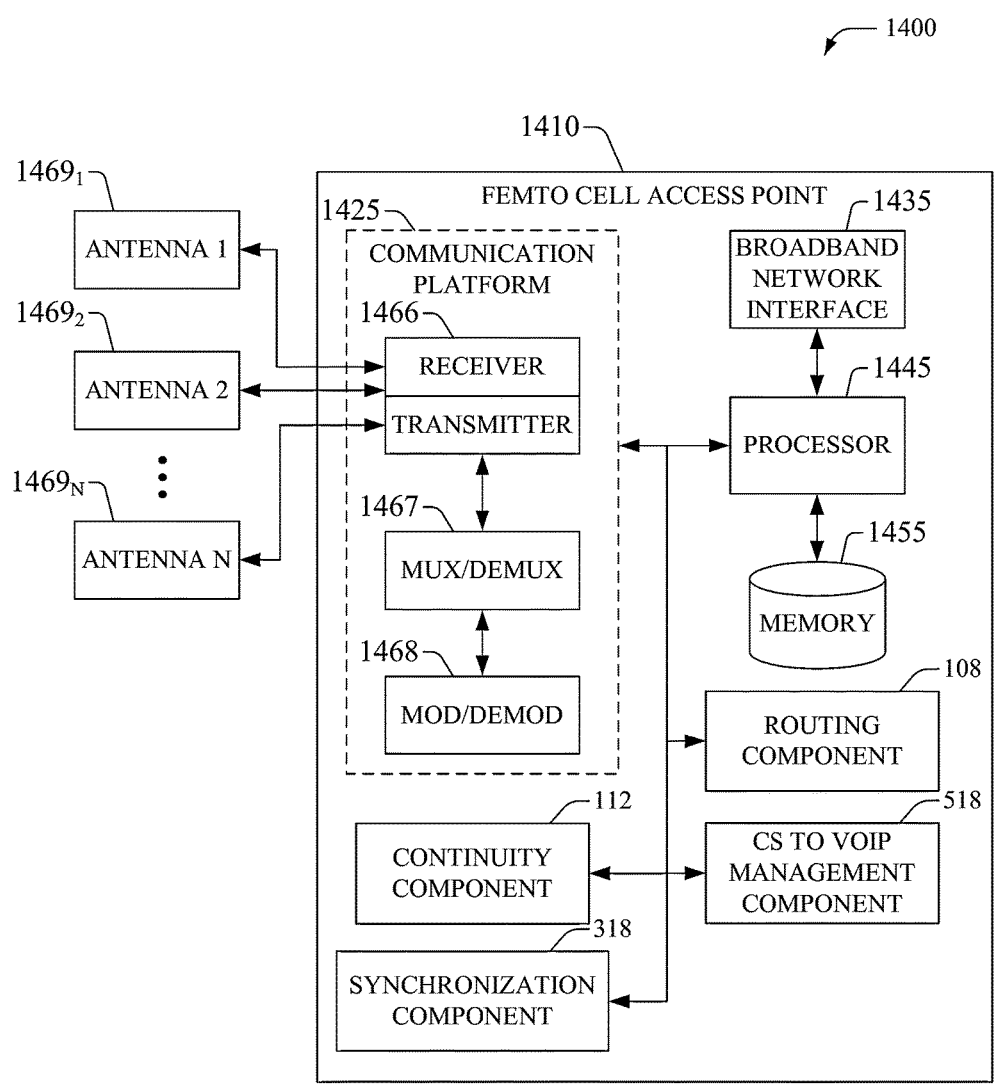
FIG. 14 illustrates an example embodiment of a femto access point that can facilitate session continuity during local breakout, according to the subject disclosure.

To provide further context for various aspects of the subject specification, FIGS. 13 and 14 illustrate, respectively, an example wireless communication environment 1300, with associated components for operation of a femtocell, and a block diagram of an example embodiment 1400 of a femto access point, which can facilitate communication session continuity at a femtocell in accordance with aspects described herein.

Wireless communication environment 1300 includes two wireless network platforms: (i) A macro network platform 1310 that serves, or facilitates communication with user equipment 1375 via a macro radio access network (RAN) 1370. It should be appreciated that in cellular wireless technologies (e.g., 3GPP UMTS, HSPA, 3GPP LTE, 3GPP UMB), macro network platform 1310 is embodied in a Core Network. (ii) A femto network platform 1380, which can provide communication with UE 1375 through a femto RAN 1390 linked to the femto network platform 1380 via backhaul pipe(s) 1385, wherein backhaul pipe(s) are substantially the same a backhaul link 1240. It should be appreciated that femto network platform 1380 typically offloads UE 1375 from macro network, once UE 1375 attaches (e.g., through macro-to-femto handover, or via a scan of channel resources in idle mode) to femto RAN. According to an aspect, the continuity component 112 can facilitate efficient communication of traffic between the DH LAN 310 and the UE 1375, when the UE 1375 moves between the macro RAN 1370 and the femto RAN 1390. Further, it can be appreciated that the continuity component 112 can include functionality, more fully described herein, for example, with respect to systems 100-700.

It is noted that RAN includes base station(s), or access point(s), and its associated electronic circuitry and deployment site(s), in addition to a wireless radio link operated in accordance with the base station(s). Accordingly, macro RAN 1370 can comprise various coverage cells like cell 1205, while femto RAN 1390 can comprise multiple femtocell access points. As mentioned above, it is to be appreciated that deployment density in femto RAN 1390 is substantially higher than in macro RAN 1370.

Generally, both macro and femto network platforms 1310 and 1380 can include components, e.g., nodes, gateways, interfaces, servers, or platforms, that facilitate both packet-switched (PS) and circuit-switched (CS) traffic (e.g., voice and data) and control generation for networked wireless communication. For example, macro network platform 1310 includes CS gateway node(s) 1312 which can interface CS traffic received from legacy networks like telephony network(s) 1340 (e.g., public switched telephone network (PSTN), or public land mobile network (PLMN)) or a SS7 network 1360. Moreover, CS gateway node(s) 1312 interfaces CS-based traffic and signaling and gateway node(s) 1318.

In addition to receiving and processing CS-switched traffic and signaling, gateway node(s) 1318 can authorize and authenticate PS-based data sessions with served (e.g., through macro RAN) wireless devices. Data sessions can include traffic exchange with networks external to the macro network platform 1310, like wide area network(s) (WANs) 1350; it should be appreciated that local area network(s) (LANs) can also be interfaced with macro network platform 1310 through gateway node(s) 1318. Gateway node(s) 1318 generates packet data contexts when a data session is established. It should be further appreciated that the packetized communication can include multiple flows that can be generated through server(s) 1314. Macro network platform 1310 also includes serving node(s) 1316 that convey the various packetized flows of information, or data streams, received through gateway node(s) 1318. It is to be noted that server(s) 1314 can include one or more processor configured to confer at least in part the functionality of macro network platform 1310. To that end, the one or more processor can execute code instructions stored in memory 1330, for example.

In example wireless environment 1300, memory 1330 stores information related to operation of macro network platform 1310. Information can include business data associated with subscribers; market plans and strategies, e.g., promotional campaigns, business partnerships; operational data for mobile devices served through macro network platform; service and privacy policies; end-user service logs for law enforcement; and so forth. Memory 1330 can also store information from at least one of telephony network(s) 1340, WAN(s) 1350, or SS7 network 1360.

Femto gateway node(s) 1384 have substantially the same functionality as PS gateway node(s) 1318. Additionally, femto gateway node(s) 1384 can also include substantially all functionality of serving node(s) 1316. In an aspect, femto gateway node(s) 1384 facilitates handover resolution, e.g., assessment and execution. Server(s) 1382 have substantially the same functionality as described in connection with server(s) 1314 and can include one or more processor configured to confer at least in part the functionality of macro network platform 1310. To that end, the one or more processor can execute code instructions stored in memory 1386, for example.

Memory 1386 can include information relevant to operation of the various components of femto network platform 1380. For example operational information that can be stored in memory 1386 can comprise, but is not limited to, subscriber information; contracted services; maintenance and service records; femtocell configuration (e.g., devices served through femto RAN 1390; access control lists, or white lists); service policies and specifications; privacy policies; add-on features; and so forth With respect to FIG. 14, in example embodiment 1400, femtocell AP 1410 can receive and transmit signal(s) (e.g., traffic and control signals) from and to wireless devices, access terminals, wireless ports and routers, etc., through a set of antennas 1469$_1$-1469$_N$. It should be appreciated that while antennas 1469$_1$-1469$_N$ are a part of communication platform 1425, which comprises electronic components and associated circuitry that provides for processing and manipulating of received signal(s) (e.g., a packet flow) and signal(s) (e.g., a broadcast control channel) to be transmitted. In an aspect, communication platform 1425 includes a transmitter/receiver (e.g., a transceiver) 1466 that can convert signal(s) from analog format to digital format upon reception, and from digital format to analog format upon transmission. In addition, receiver/transmitter 1466 can divide a single data stream into multiple, parallel data streams, or perform the reciprocal operation. Coupled to transceiver 1466 is a multiplexer/demultiplexer 1467 that facilitates manipulation of signal in time and frequency space. Electronic component 1467 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1467 can scramble and spread information (e.g., codes) according to substantially any code known in the art; e.g., Hadamard-Walsh codes, Baker codes, Kasami codes, polyphase codes, and so on. A modulator/demodulator 1468 is also a part of operational group 1425, and can modulate information according to multiple modulation techniques, such as frequency modulation, amplitude modulation (e.g., M-ary quadrature amplitude modulation (QAM), with M a positive integer), phase-shift keying (PSK), and the like.

Femto access point 1410 also includes a processor 1445 configured to confer functionality, at least partially, to substantially any electronic component in the femto access point 1410, in accordance with aspects of the subject innovation. In particular, processor 1445 can facilitate femto AP 1410 to implement configuration instructions received through communication platform 1425, which can include storing data in memory 1455. In addition, processor 1445 facilitates femto AP 1410 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1445 can manipulate antennas 1469₁-1469ₙ to facilitate beamforming or selective radiation pattern formation, which can benefit specific locations (e.g., basement, home office . . . ), covered by femto AP; and exploit substantially any other advantages associated with smart-antenna technology. Memory 1455 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1455 can store configuration information such as schedules and policies; femto AP address(es) or geographical indicator(s); access lists (e.g., white lists); license(s) for utilization of add-features for femto AP 1410, and so forth.

In embodiment 1400, processor 1445 is coupled to the memory 1455 in order to store and retrieve information necessary to operate and/or confer functionality to communication platform 1425, broadband network interface 1335 (e.g., a broadband modem), and other operational components (e.g., multimode chipset(s), power supply sources . . . ; not shown) that support femto access point 1410. The femto AP 1410 can further include a routing component 108, continuity component 112, synchronization component 318, CS to VoIP component 518, which can include functionality, as more fully described herein, for example, with regard to systems 100-700. In addition, it is to be noted that the various aspects disclosed in the subject specification can also be implemented through (i) program modules stored in a computer-readable storage medium or memory (e.g., memory 1386 or memory 1455) and executed by a processor (e.g., processor 1445), or (ii) other combination(s) of hardware and software, or hardware and firmware.

Figure 15:
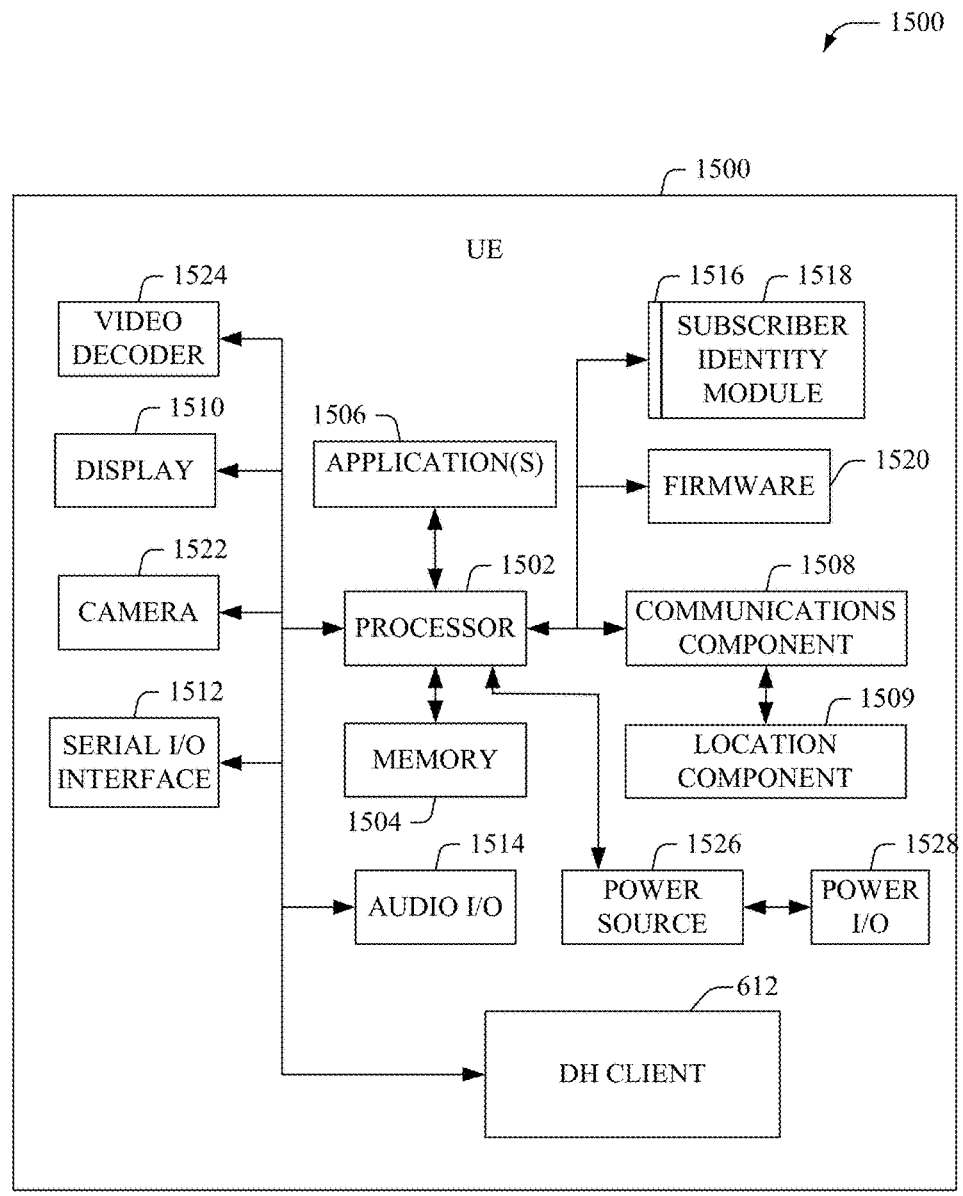
FIG. 15 illustrates a block diagram of a UE suitable for communication with a DH LAN via a femto network in accordance with the innovation.

Referring now to FIG. 15, there is illustrated a block diagram of a UE 1500 suitable for communication with a DH LAN via a femto network in accordance with the innovation. The UE 1500 can include a processor 1502 for controlling all onboard operations and processes. A memory 1504 can interface to the processor 1502 for storage of data and one or more applications 1506 being executed by the processor 1502. A communications component 1508 can interface to the processor 1502 to facilitate wired/wireless communication with external systems (e.g., femtocell and macro cell). The communications component 1508 interfaces to a location component 1509 (e.g., GPS transceiver) that can facilitate location detection of the UE 1500. Note that the location component 1509 can also be included as part of the communications component 1508.

The UE 1500 can include a display 1510 for displaying content downloaded and/or for displaying text information related to operating and using the device features. A serial I/O interface 1512 is provided in communication with the processor 1502 to facilitate serial communication (e.g., USB, and/or IEEE 1394) via a hardwire connection. Audio capabilities are provided with an audio I/O component 1514, which can include a speaker for the output of audio signals related to, for example, recorded data or telephony voice data, and a microphone for inputting voice signals for recording and/or telephone conversations.

The device 1500 can include a slot interface 1516 for accommodating a subscriber identity module (SIM) 1518. Firmware 1520 is also provided to store and provide to the processor 1502 startup and operational data. The UE 1500 can also include an image capture component 1522 such as a camera and/or a video decoder 1524 for decoding encoded multimedia content. The UE 1500 can also include a power source 1526 in the form of batteries, which power source 1526 interfaces to an external power system or charging equipment via a power I/O component 1528. In addition, the UE 1500 can include a DH client 612 that facilitates communication between UE 1500 and home network via a femto AP. The DH client 612 can include functionality, as more fully described herein, for example, with regard to system 600.

Figure 16:
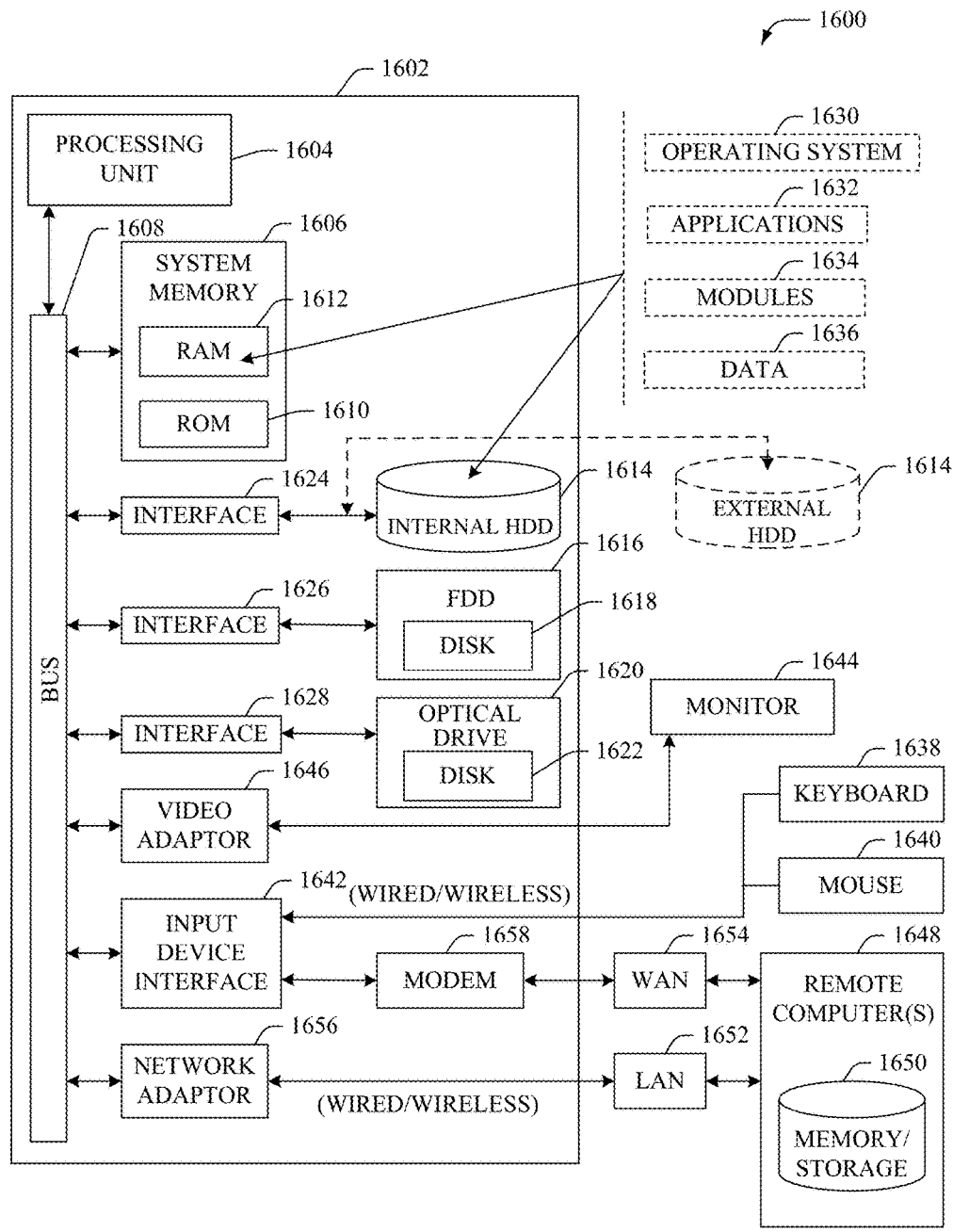
FIG. 16 illustrates a block diagram of a computer operable to execute the disclosed communication architecture.

Referring now to FIG. 16, there is illustrated a block diagram of a computer operable to execute the disclosed communication architecture. In order to provide additional context for various aspects of the subject specification, FIG. 16 and the following discussion are intended to provide a brief, general description of a suitable computing environment 1600 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 16, the example environment 1600 for implementing various aspects of the specification includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes read-only memory (ROM) 1610 and random access memory (RAM) 1612. A basic input/output system (BIOS) is stored in a non-volatile memory 1610 such as ROM, EPROM, EEPROM, which BIOS contains the basic routines that help to transfer information between elements within the computer 1602, such as during start-up. The RAM 1612 can also include a high-speed RAM such as static RAM for caching data.

The computer 1602 further includes an internal hard disk drive (HDD) 1614 (e.g., EIDE, SATA), which internal hard disk drive 1614 can also be configured for external use in a suitable chassis (not shown), a magnetic floppy disk drive (FDD) 1616, (e.g., to read from or write to a removable diskette 1618) and an optical disk drive 1620, (e.g., reading a CD-ROM disk 1622 or, to read from or write to other high capacity optical media such as the DVD). The hard disk drive 1614, magnetic disk drive 1616 and optical disk drive 1620 can be connected to the system bus 1608 by a hard disk drive interface 1624, a magnetic disk drive interface 1626 and an optical drive interface 1628, respectively. The interface 1624 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. It is appreciated that the specification can be implemented with various commercially available operating systems or combinations of operating systems.

A user can enter commands and information into the computer 1602 through one or more wired/wireless input devices, e.g., a keyboard 1638 and a pointing device, such as a mouse 1640. Other input devices (not shown) can include a microphone, an IR remote control, a joystick, a game pad, a stylus pen, touch screen, or the like. These and other input devices are often connected to the processing unit 1604 through an input device interface 1642 that is coupled to the system bus 1608, but can be connected by other interfaces, such as a parallel port, an IEEE 1394 serial port, a game port, a USB port, an IR interface, etc.

A monitor 1644 or other type of display device is also connected to the system bus 1608 via an interface, such as a video adapter 1646. In addition to the monitor 1644, a computer typically includes other peripheral output devices (not shown), such as speakers, printers, etc.

The computer 1602 can operate in a networked environment using logical connections via wired and/or wireless communications to one or more remote computers, such as a remote computer(s) 1648. The remote computer(s) 1648 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1650 is illustrated. The logical connections depicted include wired/wireless connectivity to a local area network (LAN) 1652 and/or larger networks, e.g., a wide area network (WAN) 1654. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 is connected to the local network 1652 through a wired and/or wireless communication network interface or adapter 1656. The adapter 1656 can facilitate wired or wireless communication to the LAN 1652, which can also include a wireless access point disposed thereon for communicating with the wireless adapter 1656.

When used in a WAN networking environment, the computer 1602 can include a modem 1658, or is connected to a communications server on the WAN 1654, or has other means for establishing communications over the WAN 1654, such as by way of the Internet. The modem 1658, which can be internal or external and a wired or wireless device, is connected to the system bus 1608 via the serial port interface 1642. In a networked environment, program modules depicted relative to the computer 1602, or portions thereof, can be stored in the remote memory/storage device 1650. It will be appreciated that the network connections shown are example and other means of establishing a communications link between the computers can be used.

The computer 1602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An access point device, comprising:
a processor; and
a memory that stores executable instructions that, when executed by the processor, facilitate performance of operations, comprising:
determining that a user equipment, located in a coverage area of the access point device, has communicatively attached to the access point device, wherein the access point device is connected to a local network device via a backhaul link and a local area network;
in response to determining that the user equipment has previously detached from a femto access point device other than the access point device while the user equipment was communicatively coupled to the local network device via the femto access point device, resulting in an interrupted communication session, receiving, from the femto access point device, status information stored at the femto access point device indicating an amount of data communicated in the interrupted communication session with the local network device, wherein the status information facilitates reestablishing the interrupted communication session via the access point device, the femto access point device, the backhaul link and local area network; and
in response to the determining that the user equipment has communicatively attached to the network device via the access point device, backhaul link, the femto access point device, and local area network, synchronizing a resumption of a transmission of the data via the access point device, the femto access point device, and the local area network based on the status information corresponding to the interrupted communication session.

2. The access point device of claim 1, wherein the synchronizing comprises synchronizing the resumption of the transmission of the data via a communication path that is determined based on address information associated with the data.

3. The access point device of claim 1, wherein the data comprises a data packet and the synchronizing comprises synchronizing the resumption of the transmission of the data via a communication path that is determined based on a type of the data packet.

4. The access point device of claim 1, wherein the synchronizing comprises synchronizing the resumption of the transmission of the data via a communication path that is determined based on a communication protocol utilized for the synchronizing.

5. The access point device of claim 1, wherein the synchronizing comprises synchronizing the resumption of the transmission of the data via a communication path that is determined based on a policy associated with the user equipment.

6. The access point device of claim 1, wherein the determining that the user equipment has communicatively attached to the access point device is based on input data received from the user equipment.

7. The access point device of claim 1, wherein the determining that the user equipment has communicatively attached to the access point device is based on historical data associated with the user equipment.

8. The access point device of claim 1, wherein the determining that the user equipment has communicatively attached to the access point device is based on a geographical location of the user equipment.

9. A femto access point device, comprising:
a processor; and
a memory that stores executable instructions that, when executed by the processor, facilitate performance of operations, comprising:
determining that a user equipment is altering a communicative attachment with the femto access point device;
in response to the determining that the altering the communicative attachment comprises the user equipment communicatively detaching from the femto access point device, storing context information, indicative of an amount of data that has been transmitted between the user equipment and a network device of a local area network attached to the femto access point device, via a data store of the femto access point device, wherein the context information supports synchronized restoration of a communication session between the user equipment and the network device via a communications network device other than the femto access point device, wherein communication between the communication network device other than the femto access point device and the network device of a local area network is via a communication path comprising a backhaul link and the femto access point device; and
in response to the determining that the altering the communicative attachment comprises the user equipment communicatively attaching to the communication network device other than the femto access point device, facilitating restoring the communication session based on the context information to enable the synchronized restoration of the communication session, between the user equipment and the network device of the local area network via the communication network device other than the femto access point device.

10. The femto access point device of claim 9, wherein the context information comprises address information associated with the data, and wherein the address information facilitates accessing the data via a communication path between the user equipment and the network device comprising the communications network device other than the femto access point device.

11. The femto access point device of claim 9, wherein the data comprises a data packet and the synchronized restoration of the communication session is via a communication path that is determined based a type of the data packet.

12. The femto access point device of claim 9, wherein the synchronized restoration of the communication session is via a communication path that is determined based on a communication protocol utilized for the synchronized restoration of the communication session.

13. The femto access point device of claim 9, wherein the synchronized restoration of the communication session is via a communication path that is determined based on a policy associated with the user equipment.

14. The femto access point device of claim 9, wherein the determining that the user equipment has communicatively detached from the femto access point device is based on input data received from the user equipment.

15. The femto access point device of claim 9, wherein the determining that the user equipment has communicatively detached from the femto access point device is based on historical data associated with the user equipment.

16. The femto access point device of claim 9, wherein the determining that the user equipment has communicatively detached from the femto access point device is based on a geographical location of the user equipment.

17. A method, comprising:
in response to determining that a user equipment has communicatively decoupled from a femto access point device comprising a processor, determining, by the femto access point device, context information indicative of an amount of data that has been transmitted between the user equipment and a local network device, wherein the femto access point device enabled access to the local network device via a local access network connected to the femto access point device;
storing, by the femto access point device, the context information on a data store of the femto access point device; and
in response to determining that the user equipment has communicatively coupled with an access point device other than the femto access point device after having become decoupled, enabling, by the femto access point device, access to the context information to enable synchronized resumption of the transmission of the data, wherein the synchronized resumption the transmission of the data is facilitated by a transmission of the data via a macro network device based on the context information stored on the femto access point device, and wherein the local network device of the local access network is accessible by the user equipment via a network connection traversing the macro network device, the femto access point device, and a backhaul link.

18. The method of claim 17, wherein the synchronized resumption of the transmission of the data is via a communication path that is determined based on address information associated with the data.

19. The method of claim 17, wherein the determining that the user equipment has communicatively decoupled from the femto access point device is based on historical data associated with the user equipment.

20. The method of claim 17, wherein the determining that the user equipment has communicatively decoupled from the femto access point device is based on location data indicative of a geographical location of the user equipment.

* * * * *